(12) United States Patent
Zhang et al.

(10) Patent No.: US 12,149,966 B2
(45) Date of Patent: Nov. 19, 2024

(54) SYMBOL LEVEL BEAM SWEEPING CAPABILITY REPORTING

(71) Applicant: Apple Inc., Cupertino, CA (US)

(72) Inventors: Yushu Zhang, Beijing (CN); Dawei Zhang, Saratoga, CA (US); Fangli Xu, Beijing (CN); Haijing Hu, Beijing (CN); Haitong Sun, Irvine, CA (US); Huaning Niu, San Jose, CA (US); Jie Cui, San Jose, CA (US); Manasa Raghavan, Sunnyvale, CA (US); Wei Zeng, San Diego, CA (US); Weidong Yang, San Diego, CA (US); Yakun Sun, San Jose, CA (US); Yang Tang, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 338 days.

(21) Appl. No.: 17/437,403

(22) PCT Filed: Sep. 15, 2020

(86) PCT No.: PCT/CN2020/115244
§ 371 (c)(1),
(2) Date: Sep. 8, 2021

(87) PCT Pub. No.: WO2022/056657
PCT Pub. Date: Mar. 24, 2022

(65) Prior Publication Data
US 2022/0312233 A1    Sep. 29, 2022

(51) Int. Cl.
*H04W 24/08*  (2009.01)
*H04B 7/06*   (2006.01)
*H04W 8/24*   (2009.01)

(52) U.S. Cl.
CPC .......... *H04W 24/08* (2013.01); *H04B 7/0626* (2013.01); *H04W 8/24* (2013.01)

(58) Field of Classification Search
CPC ....... H04W 24/08; H04W 24/10; H04W 8/22; H04W 8/24; H04W 8/245; H04B 7/0617;
(Continued)

(56) References Cited

U.S. PATENT DOCUMENTS

2019/0058561 A1    2/2019  Loteanu
2019/0150013 A1*   5/2019  Zhang ................... H04B 7/082
                                                    375/224
(Continued)

FOREIGN PATENT DOCUMENTS

CN    109890079        6/2019
CN    110268667 A      9/2019
(Continued)

OTHER PUBLICATIONS

International Search Report for PCT Patent Application No. PCT/CN2020/115244; mailed Jun. 17, 2021.
(Continued)

*Primary Examiner* — Kevin D Mew
(74) *Attorney, Agent, or Firm* — Kowert, Hood, Munyon, Rankin & Goetzel, P.C.

(57) ABSTRACT

Apparatuses, systems, and methods for beam indication latency reduction via symbol level beam sweeping capability reporting. A wireless device may transmit, to a base station, a report associated with symbol level beam sweeping. The wire wireless device may receive, from the base station, a symbol level beam sweeping configuration. The symbol level beam sweeping configuration may be based, at least in part, on the report. The wireless device may perform synchronization signal block (SSB) measurements according to the report and the symbol level beam sweeping configuration.

20 Claims, 17 Drawing Sheets

(58) Field of Classification Search
CPC .... H04B 7/0619; H04B 7/0626; H04B 7/063; H04B 7/0636; H04B 7/0639
See application file for complete search history.

(56) References Cited

U.S. PATENT DOCUMENTS

| | | | |
|---|---|---|---|
| 2019/0230545 A1* | 7/2019 | Liou | H04W 24/10 |
| 2019/0268787 A1 | 8/2019 | Guan | |
| 2019/0387417 A1 | 12/2019 | Nilsson et al. | |
| 2020/0084642 A1* | 3/2020 | Siomina | H04W 56/001 |
| 2020/0100131 A1 | 3/2020 | Yang | |
| 2020/0136690 A1* | 4/2020 | Noh | H04W 72/23 |
| 2020/0220631 A1* | 7/2020 | Onggosanusi | H04B 17/327 |
| 2020/0245166 A1* | 7/2020 | Kwak | H04B 7/024 |
| 2020/0314676 A1* | 10/2020 | Lin | H04L 5/0094 |
| 2020/0358515 A1* | 11/2020 | Li | H04L 5/0053 |
| 2020/0367193 A1* | 11/2020 | Cha | H04W 48/12 |
| 2021/0045076 A1* | 2/2021 | Tomeba | H04W 56/001 |
| 2021/0067978 A1* | 3/2021 | Cheraghi | H04B 17/336 |
| 2021/0068123 A1* | 3/2021 | Zhu | H04B 7/0874 |
| 2021/0135734 A1* | 5/2021 | Abedini | H04B 7/063 |
| 2021/0185550 A1* | 6/2021 | Abedini | H04W 48/16 |
| 2022/0394505 A1 | 12/2022 | Franke | |
| 2023/0276379 A1 | 8/2023 | Nilsson | |

FOREIGN PATENT DOCUMENTS

| | | | | |
|---|---|---|---|---|
| EP | 3579480 A1 | | 12/2019 | |
| EP | 3637634 A1 | * | 4/2020 | .......... H04B 7/0617 |
| WO | WO-2018141981 A1 | * | 8/2018 | .......... H04B 7/0408 |
| WO | 2018236262 | | 12/2018 | |
| WO | WO-2020033914 A1 | * | 2/2020 | .......... H04B 7/0404 |
| WO | WO-2020040672 A1 | * | 2/2020 | .......... H04B 7/0695 |
| WO | WO-2020041125 A1 | * | 2/2020 | .......... H04B 7/0628 |
| WO | 2021068006 | | 4/2021 | |

OTHER PUBLICATIONS

Huawei et al. "Beam reporting for beam management"; 3GPP TSG RAN WG1 Meeting #90 R1-1713757; Prague, Czech Republic; Aug. 21-25, 2017.

International Search Report for PCT Patent Application No. PCT/CN2020/115171; Jun. 18, 2021.

* cited by examiner

```
CSI-ReportConfig ::=            SEQUENCE {
    reportConfigId                  CSI-ReportConfigId,
    carrier                         ServCellIndex                   OPTIONAL, -- Need S
    resourcesForChannelMeasurement  CSI-ResourceConfigId,
    csi-IM-ResourcesForInterference CSI-ResourceConfigId            OPTIONAL, -- Need R
    nzp-CSI-RS-ResourcesForInterference CSI-ResourceConfigId        OPTIONAL, -- Need R
    intraSymbolBeamSweepingSSB      ENUMERATED {enabled}            OPTIONAL
    ...
}
```

*FIG. 11A*

```
CSI-ReportConfig ::=            SEQUENCE {
    reportConfigId                  CSI-ReportConfigId,
    carrier                         ServCellIndex                   OPTIONAL, -- Need S
    resourcesForChannelMeasurement  CSI-ResourceConfigId,
    csi-IM-ResourcesForInterference CSI-ResourceConfigId            OPTIONAL, -- Need R
    nzp-CSI-RS-ResourcesForInterference CSI-ResourceConfigId        OPTIONAL, -- Need R
    nrofBeamsPerSSB                 INTEGER (3..4)                  OPTIONAL
    ...
}
```

*FIG. 11B*

```
ServingCellConfigCommon ::=     SEQUENCE {
    physCellId                          PhysCellId                                                          OPTIONAL, -- Cond HOAndServCellAdd,
    downlinkConfigCommon                DownlinkConfigCommon                                                OPTIONAL, -- Cond HOAndServCellAdd,
    uplinkConfigCommon                  UplinkConfigCommon                                                  OPTIONAL, -- Need M
    supplementaryUplinkConfig           UplinkConfigCommon                                                  OPTIONAL, -- Need S
    n-TimingAdvanceOffset               ENUMERATED {n0, n25600, n39936}                                     OPTIONAL, -- Need S
    ssb-PositionsInBurst                CHOICE {
        shortBitmap                         BIT STRING (SIZE(4)),
        mediumBitmap                        BIT STRING (SIZE(8)),
        longBitmap                          BIT STRING (SIZE(64))
    }                                                                                                       OPTIONAL, -- Cond AbsFreqSSB
    ssb-periodicityServingCell          ENUMERATED {ms5, ms10, ms20, ms40, ms160, spare2, spare1}           OPTIONAL, -- Need S
    dmrs-TypeA-Position                 ENUMERATED {pos2, pos3},                                            OPTIONAL
    lte-CRS-ToMatchAround               SetupRelease {RateMatchPatternLTE-CRS}                              OPTIONAL, -- Need M
    rateMatchPatternToAddModList        SEQUENCE (SIZE (1..maxNrofRateMatchPatterns)) OF RateMatchPattern   OPTIONAL, -- Need N
    rateMatchPatternToReleaseList       SEQUENCE (SIZE (1..maxNrofRateMatchPatterns)) OF RateMatchPatternID OPTIONAL, -- Need N
    ssbSubcarrierSpacing                SubcarrierSpacing                                                   OPTIONAL, -- Cond HOAndServCellWithSSB
    tdd-UL-DL-ConfigurationCommon       TDD-UL-DL-ConfigCommon                                              OPTIONAL, -- Cond TDD
    ss-PBCH-BlockPower                  INTEGER (-60..50),
    ...,
    [[
    channelAccessMode-r16               CHOICE {
        dynamic                             NULL,
        semistatic                          SemiStaticChannelAccessConfig
    }                                                                                                       OPTIONAL, -- Need M
    discoveryBurst-WindowLength-r16     ENUMERATED {sdot5, s1, s2, s3, s4, s5}                              OPTIONAL, -- Need M
    ssb-PositionQCL-Relationship-r16                                                                        OPTIONAL, -- Need M
    intraCellGuardBandUL-r16                                                                                OPTIONAL, -- Need M
    intraCellGuardBandDL-r16                                                                                OPTIONAL, -- Need M
    ]]
}
```

FIG. 12A

```
ServingCellConfigCommon ::=    SEQUENCE {
    physCellId                     PhysCellId
    downlinkConfigCommon           DownlinkConfigCommon                                    OPTIONAL, -- Cond HOAndServCellAdd,
    uplinkConfigCommon             UplinkConfigCommon                                      OPTIONAL, -- Cond HOAndServCellAdd,
    supplementaryUplinkConfig      UplinkConfigCommon                                      OPTIONAL, -- Need M
    n-TimingAdvanceOffset          ENUMERATED {n0, n25600, n39936}                         OPTIONAL, -- Need S
    ssb-PositionsInBurst           CHOICE {
        shortBitmap                    BIT STRING (SIZE(4)),
        mediumBitmap                   BIT STRING (SIZE(8)),
        longBitmap                     BIT STRING (SIZE(64))
    }                                                                                      OPTIONAL, -- Cond AbsFreqSSB
    ssb-periodicityServingCell     ENUMERATED {ms5, ms10, ms20, ms40, ms160, spare2, spare1} OPTIONAL, -- Need S
    epreOffsetPss                  CHOICE {
        shortBitmap                    BIT STRING (SIZE(4)),
        mediumBitmap                   BIT STRING (SIZE(8)),
        longBitmap                     BIT STRING (SIZE(64))
    }                                                                                      OPTIONAL,
    dmrs-TypeA-Position
    lte-CRS-ToMatchAround          ENUMERATED {pos2, pos3},
    rateMatchPatternToAddModList   SetupRelease {RateMatchPatternLTE-CRS}                  OPTIONAL, -- Need M
    rateMatchPatternToReleaseList  SEQUENCE (SIZE(1..maxNrofRateMatchPatterns)) OF RateMatchPattern OPTIONAL, -- Need N
    ssbSubcarrierSpacing           SEQUENCE (SIZE(1..maxNrofRateMatchPatterns)) OF RateMatchPatternID OPTIONAL, -- Need N
    tdd-UL-DL-ConfigurationCommon  SubcarrierSpacing                                       OPTIONAL, -- Cond HOAndServCellWithSSB
    ss-PBCH-BlockPower             TDD-UL-DL-ConfigCommon                                  OPTIONAL, -- Cond TDD
                                   INTEGER (-60..50)
    [[
    channelAccessMode-r16          CHOICE {
        dynamic                        NULL,
        semistatic                     SemiStaticChannelAccessConfig
    }
    discoveryBurst-WindowLength-r16 ENUMERATED {isOdot5, s1, s2, s3, s4, s5}               OPTIONAL, -- Need M
    ssb-PositionQCL-r16            SSB-PositionQCL-Relationship-r16                        OPTIONAL, -- Need M
    intraCellGuardBandUL-r16       IntraCellGuardBand-r16                                  OPTIONAL, -- Need M
    intraCellGuardBandDL-r16       IntraCellGuardBand-r16                                  OPTIONAL, -- Need M
    ]]
}
```

FIG. 12B

SYMBOL LEVEL BEAM SWEEPING CAPABILITY REPORTING

PRIORITY CLAIM INFORMATION

This application is a national stage application of International Application No. PCT/CN2020/115244, filed on Sep. 15, 2020, titled "Symbol Level Beam Sweeping Capability Reporting", which is hereby incorporated by reference in its entirety.

FIELD

The invention relates to wireless communications, and more particularly to apparatuses, systems, and methods for beam indication latency reduction, e.g., via symbol level beam sweeping capability reporting and/or a symbol level beam sweeping configuration.

DESCRIPTION OF THE RELATED ART

Wireless communication systems are rapidly growing in usage. In recent years, wireless devices such as smart phones and tablet computers have become increasingly sophisticated. In addition to supporting telephone calls, many mobile devices now provide access to the internet, email, text messaging, and navigation using the global positioning system (GPS), and are capable of operating sophisticated applications that utilize these functionalities.

Long Term Evolution (LTE) has become the technology of choice for the majority of wireless network operators worldwide, providing mobile broadband data and high-speed Internet access to their subscriber base. LTE defines a number of downlink (DL) physical channels, categorized as transport or control channels, to carry information blocks received from medium access control (MAC) and higher layers. LTE also defines a number of physical layer channels for the uplink (UL).

For example, LTE defines a Physical Downlink Shared Channel (PDSCH) as a DL transport channel. The PDSCH is the main data-bearing channel allocated to users on a dynamic and opportunistic basis. The PDSCH carries data in Transport Blocks (TB) corresponding to a MAC protocol data unit (PDU), passed from the MAC layer to the physical (PHY) layer once per Transmission Time Interval (TTI). The PDSCH is also used to transmit broadcast information such as System Information Blocks (SIB) and paging messages.

As another example, LTE defines a Physical Downlink Control Channel (PDCCH) as a DL control channel that carries the resource assignment for UEs that are contained in a Downlink Control Information (DCI) message. Multiple PDCCHs can be transmitted in the same subframe using Control Channel Elements (CCE), each of which is a nine set of four resource elements known as Resource Element Groups (REG). The PDCCH employs quadrature phase-shift keying (QPSK) modulation, with four QPSK symbols mapped to each REG. Furthermore, 1, 2, 4, or 8 CCEs can be used for a UE, depending on channel conditions, to ensure sufficient robustness.

Additionally, LTE defines a Physical Uplink Shared Channel (PUSCH) as a UL channel shared by all devices (user equipment, UE) in a radio cell to transmit user data to the network. The scheduling for all UEs is under control of the LTE base station (enhanced Node B, or eNB). The eNB uses the uplink scheduling grant (DCI format 0) to inform the UE about resource block (RB) assignment, and the modulation and coding scheme to be used. PUSCH typically supports QPSK and quadrature amplitude modulation (QAM). In addition to user data, the PUSCH also carries any control information necessary to decode the information, such as transport format indicators and multiple-in multiple-out (MIMO) parameters. Control data is multiplexed with information data prior to digital Fourier transform (DFT) spreading.

A proposed next telecommunications standard moving beyond the current International Mobile Telecommunications-Advanced (IMT-Advanced) Standards is called 5th generation mobile networks or 5th generation wireless systems, or 5G for short (otherwise known as 5G-NR for 5G New Radio, also simply referred to as NR). 5G-NR may provide a higher capacity for a higher density of mobile broadband users, also supporting device-to-device, ultra-reliable, and massive machine type communications with lower latency and/or lower battery consumption. Further, the 5G-NR may allow for more flexible UE scheduling as compared to current LTE. Consequently, efforts are being made in ongoing developments of 5G-NR to take advantage of higher throughputs possible at higher frequencies.

SUMMARY

Embodiments relate to wireless communications, and more particularly to apparatuses, systems, and methods for beam indication latency reduction, e.g., via symbol level beam sweeping capability reporting and/or a symbol level beam sweeping configuration.

For example, in some embodiments, a user equipment device (UE), such as UE 106, may be configured to transmit, to a base station, a report associated with symbol level beam sweeping. The UE may be configured to receive, from the base station, a symbol level beam sweeping configuration. The symbol level beam sweeping configuration may be based, at least in part, on the report. The UE may be configured to perform synchronization signal block (SSB) measurements according to the report and the symbol level beam sweeping configuration.

As another example, in some embodiments, a UE, such as UE 106, may be configured to transmit, to a base station, a report associated with symbol level beam sweeping. The UE may be configured to receive, from the base station, a symbol level beam sweeping configuration. In some embodiments, the symbol level beam sweeping configuration may be based, at least in part, on the report. In some embodiments, the symbol level beam sweeping configuration may include an indication of an energy per resource element (EPRE) offset between a primary synchronization symbol (PSS) and a secondary synchronization symbol (SSS) of an SSB and/or an indication of an EPRE offset between the PSS and a physical broadcast channel (PBCH) of the SSB.

As a further example, a base station, such as base station 102, may be configured to receive, from a UE, a report associated with symbol level beam sweeping. The base station may be configured to determine a symbol level beam sweeping configuration. The symbol level beam sweeping configuration may be based, at least in part, on the report. The base station may be configured to transmit, to the UE, the symbol level beam sweeping configuration.

As another example, base station, such as base station 102, may be configured to receive, from a UE, a report associated with symbol level beam sweeping. In some embodiments, the symbol level beam sweeping configuration may include an indication of an energy per resource element (EPRE) offset between a primary synchronization symbol (PSS) and a secondary synchronization symbol (SSS) of an SSB and/or an indication of an EPRE offset between the PSS and a physical broadcast channel (PBCH) of the SSB The techniques described herein may be implemented in and/or used with a number of different types of devices, including but not limited to unmanned aerial vehicles (UAVs), unmanned aerial controllers (UACs), a UTM server, base stations, access points, cellular phones, tablet computers, wearable computing devices, portable media players, and any of various other computing devices.

This Summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the present subject matter can be obtained when the following detailed description of various embodiments is considered in conjunction with the following drawings, in which:

FIGS. 11A and 11B illustrate examples of a CSI-Report Config information element, according to some embodiments.

FIGS. 12A and 12B illustrate examples of a ServingCell Config Common information element, according to some embodiments.

Figure 1A:
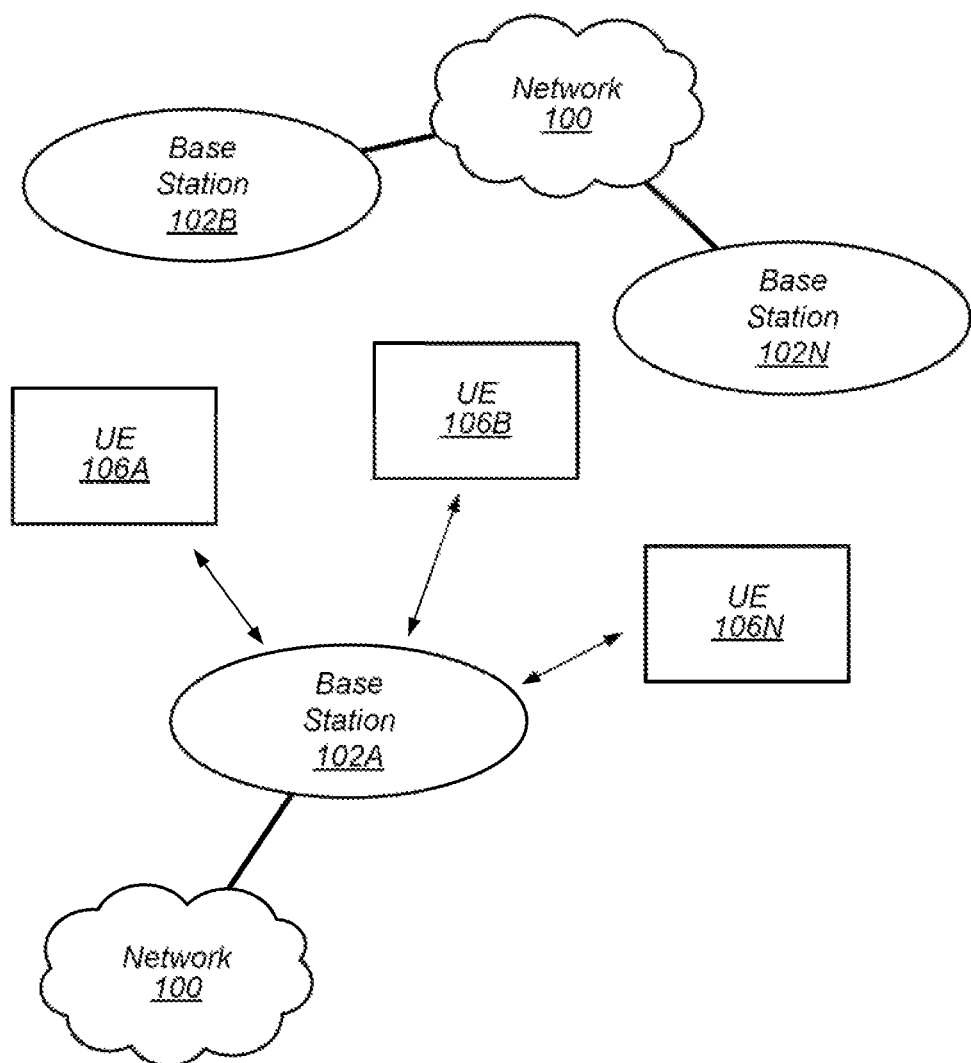
FIG. 1A illustrates an example wireless communication system according to some embodiments.

While the features described herein may be susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION

Acronyms

Various acronyms are used throughout the present disclosure. Definitions of the most prominently used acronyms that may appear throughout the present disclosure are provided below:
3GPP: Third Generation Partnership Project
UE: User Equipment
RF: Radio Frequency
BS: Base Station
DL: Downlink
UL: Uplink
LTE: Long Term Evolution
NR: New Radio
5GS: 5G System
5GMM: 5GS Mobility Management
5GC/5GCN: 5G Core Network
IE: Information Element
CE: Control Element
MAC: Medium Access Control
SSB: Synchronization Signal Block
CSI-RS: Channel State Information Reference Signal
PDCCH: Physical Downlink Control Channel
PDSCH: Physical Downlink Shared Channel
RRC: Radio Resource Control
RRM: Radio Resource Management
CORESET: Control Resource Set
TCI: Transmission Configuration Indicator
DCI: Downlink Control Indicator Terms The following is a glossary of terms used in this disclosure:

Memory Medium—Any of various types of non-transitory memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may include other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect. Examples include FPGAs (Field Programmable Gate Arrays). PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Computer System (or Computer)—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

User Equipment (UE) (or "UE Device")—any of various types of computer systems devices which are mobile or portable and which performs wireless communications. Examples of UE devices include mobile telephones or smart phones (e.g., iPhone™, Android™-based phones), portable gaming devices (e.g., Nintendo DS™, PlayStation Portable™, Gameboy Advance™, iPhone™), laptops, wearable devices (e.g. smart watch, smart glasses), PDAs, portable Internet devices, music players, data storage devices, other handheld devices, unmanned aerial vehicles (UAVs) (e.g., drones), UAV controllers (UACs), and so forth. In general, the term "UE" or "UE device" can be broadly defined to encompass any electronic, computing, and/or telecommunications device (or combination of devices) which is easily transported by a user and capable of wireless communication.

Base Station—The term "Base Station" has the full breadth of its ordinary meaning, and at least includes a wireless communication station installed at a fixed location and used to communicate as part of a wireless telephone system or radio system.

Processing Element (or Processor)—refers to various elements or combinations of elements that are capable of performing a function in a device, such as a user equipment or a cellular network device. Processing elements may include, for example: processors and associated memory, portions or circuits of individual processor cores, entire processor cores, processor arrays, circuits such as an ASIC (Application Specific Integrated Circuit), programmable hardware elements such as a field programmable gate array (FPGA), as well any of various combinations of the above.

Channel—a medium used to convey information from a sender (transmitter) to a receiver. It should be noted that since characteristics of the term "channel" may differ according to different wireless protocols, the term "channel" as used herein may be considered as being used in a manner that is consistent with the standard of the type of device with reference to which the term is used. In some standards, channel widths may be variable (e.g., depending on device capability, band conditions, etc.). For example, LTE may support scalable channel bandwidths from 1.4 MHz to 20 MHz. In contrast, WLAN channels may be 22 MHz wide while Bluetooth channels may be 1 Mhz wide. Other protocols and standards may include different definitions of channels. Furthermore, some standards may define and use multiple types of channels, e.g., different channels for uplink or downlink and/or different channels for different uses such as data, control information, etc.

Band—The term "band" has the full breadth of its ordinary meaning, and at least includes a section of spectrum (e.g., radio frequency spectrum) in which channels are used or set aside for the same purpose.

Wi-Fi—The term "Wi-Fi" (or WiFi) has the full breadth of its ordinary meaning, and at least includes a wireless communication network or RAT that is serviced by wireless LAN (WLAN) access points and which provides connectivity through these access points to the Internet. Most modem Wi-Fi networks (or WLAN networks) are based on IEEE 802.11 standards and are marketed under the name "Wi-Fi". A Wi-Fi (W LAN) network is different from a cellular network.

3GPP Access—refers to accesses (e.g., radio access technologies) that are specified by 3GPP standards. These accesses include, but are not limited to, GSM/GPRS, LTE, LTE-A, and/or 5G NR. In general, 3GPP access refers to various types of cellular access technologies.

Non-3GPP Access—refers any accesses (e.g., radio access technologies) that are not specified by 3GPP standards. These accesses include, but are not limited to, WiMAX, CDMA2000, Wi-Fi, WLAN, and/or fixed networks. Non-3GPP accesses may be split into two categories, "trusted" and "untrusted": Trusted non-3GPP accesses can interact directly with an evolved packet core (EPC) and/or a 5G core (5GC) whereas untusted non-3GPP accesses interwork with the EPC/5GC via a network entity, such as an Evolved Packet Data Gateway and/or a 5G NR gateway. In general, non-3GPP access refers to various types on non-cellular access technologies.

Automatically—refers to an action or operation performed by a computer system (e.g., software executed by the computer system) or device (e.g., circuitry, programmable hardware elements, ASICs, etc.), without user input directly specifying or performing the action or operation. Thus, the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Approximately—refers to a value that is almost correct or exact. For example, approximately may refer to a value that is within 1 to 10 percent of the exact (or desired) value. It should be noted, however, that the actual threshold value (or tolerance) may be application dependent. For example, in some embodiments, "approximately" may mean within 0.1% of some specified or desired value, while in various other embodiments, the threshold may be, for example, 2%, 3%, 5%, and so forth, as desired or as required by the particular application.

Concurrent—refers to parallel execution or performance, where tasks, processes, or programs are performed in an at least partially overlapping manner. For example, concurrency may be implemented using "strong" or strict parallelism, where tasks are performed (at least partially) in parallel on respective computational elements, or using "weak parallelism", where the tasks are performed in an interleaved manner, e.g., by time multiplexing of execution threads.

Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a set of electrical conductors may be configured to electrically connect a module to another module, even when the two modules are not connected). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

Various components may be described as performing a task or tasks, for convenience in the description. Such descriptions should be interpreted as including the phrase "configured to." Reciting a component that is configured to perform one or more tasks is expressly intended not to invoke 35 U.S.C. § 112(f) interpretation for that component.

Figure 1B:
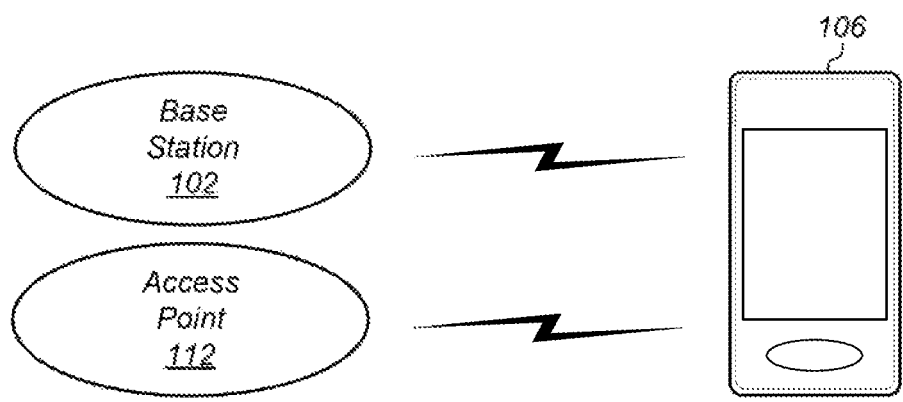
FIG. 1B illustrates an example of a base station (BS) and an access point in communication with a user equipment (UE) device according to some embodiments.

FIGS. 1A and 1B: Communication Systems

FIG. 1A illustrates a simplified example wireless communication system, according to some embodiments. It is noted that the system of FIG. 1A is merely one example of a possible system, and that features of this disclosure may be implemented in any of various systems, as desired.

As shown, the example wireless communication system includes a base station 102A which communicates over a transmission medium with one or more user devices 106A, 106B, etc., through 106N. Each of the user devices may be referred to herein as a "user equipment" (UE). Thus, the user devices 106 are referred to as UEs or UE devices.

The base station (BS) 102A may be a base transceiver station (BTS) or cell site (a "cellular base station") and may include hardware that enables wireless communication with the UEs 106A through 106N.

The communication area (or coverage area) of the base station may be referred to as a "cell." The base station 102A and the UEs 106 may be configured to communicate over the transmission medium using any of various radio access technologies (RATs), also referred to as wireless communication technologies, or telecommunication standards, such as GSM, UMTS (associated with, for example, WCDMA or TD-SCDMA air interfaces), LTE, LTE-Advanced (LTE-A), 5G new radio (5G NR), HSPA, 3GPP2 CDMA2000 (e.g., 1×RTT, 1×EV-DO, HRPD, eHRPD), etc. Note that if the base station 102A is implemented in the context of LTE, it may alternately be referred to as an 'eNodeB' or 'eNB'. Note that if the base station 102A is implemented in the context of 5G NR, it may alternately be referred to as 'gNodeB' or 'gNB'.

As shown, the base station 102A may also be equipped to communicate with a network 100 (e.g., a core network of a cellular service provider, a telecommunication network such as a public switched telephone network (PSTN), and/or the Internet, among various possibilities). Thus, the base station 102A may facilitate communication between the user devices and/or between the user devices and the network 100. In particular, the cellular base station 102A may provide UEs 106 with various telecommunication capabilities, such as voice, SMS and/or data services.

Base station 102A and other similar base stations (such as base stations 102B . . . 102N) operating according to the same or a different cellular communication standard may thus be provided as a network of cells, which may provide continuous or nearly continuous overlapping service to UEs 106A-N and similar devices over a geographic area via one or more cellular communication standards.

Thus, while base station 102A may act as a "serving cell" for UEs 106A-N as illustrated in FIG. 1, each UE 106 may also be capable of receiving signals from (and possibly within communication range of) one or more other cells (which might be provided by base stations 102B-N and/or any other base stations), which may be referred to as "neighboring cells". Such cells may also be capable of facilitating communication between user devices and/or between user devices and the network 100. Such cells may include "macro" cells, "micro" cells, "pico" cells, and/or cells which provide any of various other granularities of service area size. For example, base stations 102A-B illustrated in FIG. 1 might be macro cells, while base station 102N might be a micro cell. Other configurations are also possible.

In some embodiments, base station 102A may be a next generation base station, e.g., a 5G New Radio (5G NR) base station, or "gNB". In some embodiments, a gNB may be connected to a legacy evolved packet core (EPC) network and/or to a NR core (NRC) network. In addition, a gNB cell may include one or more transition and reception points (TRPs). In addition, a UE capable of operating according to 5G NR may be connected to one or more TRPs within one or more gNBs.

Note that a UE 106 may be capable of communicating using multiple wireless communication standards. For example, the UE 106 may be configured to communicate using a wireless networking (e.g., Wi-Fi) and/or peer-to-peer wireless communication protocol (e.g., Bluetooth, Wi-Fi peer-to-peer, etc.) in addition to at least one cellular communication protocol (e.g., GSM, UMTS (associated with, for example, WCDMA or TD-SCDMA air interfaces), LTE, LTE-A, 5G NR, HSPA, 3GPP2 CDMA2000 (e.g., 1×RTT, 1×EV-DO, HRPD, eHRPD), etc.). The UE 106 may also or alternatively be configured to communicate using one or more global navigational satellite systems (GNSS, e.g., GPS or GLONASS), one or more mobile television broadcasting standards (e.g., ATSC-M/H or DVB-H), and/or any other wireless communication protocol, if desired. Other combinations of wireless communication standards (including more than two wireless communication standards) are also possible.

FIG. 1B illustrates user equipment 106 (e.g., one of the devices 106A through 106N) in communication with a base station 102 and an access point 112, according to some embodiments. The UE 106 may be a device with both cellular communication capability and non-cellular communication capability (e.g., Bluetooth, Wi-Fi, and so forth) such as a mobile phone, a hand-held device, a computer or a tablet, or virtually any type of wireless device.

The UE 106 may include a processor that is configured to execute program instructions stored in memory. The UE 106 may perform any of the method embodiments described herein by executing such stored instructions. Alternatively, or in addition, the UE 106 may include a programmable hardware element such as an FPGA (field-programmable gate array) that is configured to perform any of the method embodiments described herein, or any portion of any of the method embodiments described herein.

The UE 106 may include one or more antennas for communicating using one or more wireless communication protocols or technologies. In some embodiments, the UE 106 may be configured to communicate using, for example, CDMA2000 (1×RTT/1×EV-DO/HRPD/eHRPD), LTE/LTE-Advanced, or 5G NR using a single shared radio and/or GSM, LTE, LTE-Advanced, or 5G NR using the single shared radio. The shared radio may couple to a single antenna, or may couple to multiple antennas (e.g., for MIMO) for performing wireless communications. In general, a radio may include any combination of a baseband processor, analog RF signal processing circuitry (e.g., including filters, mixers, oscillators, amplifiers, etc.), or digital processing circuitry (e.g., for digital modulation as well as other digital processing). Similarly, the radio may implement one or more receive and transmit chains using the aforementioned hardware. For example, the UE 106 may share one or more parts of a receive and/or transmit chain between multiple wireless communication technologies, such as those discussed above.

In some embodiments, the UE 106 may include separate transmit and/or receive chains (e.g., including separate antennas and other radio components) for each wireless communication protocol with which it is configured to communicate. As a further possibility, the UE 106 may include one or more radios which are shared between multiple wireless communication protocols, and one or more radios which are used exclusively by a single wireless communication protocol. For example, the UE 106 might include a shared radio for communicating using either of LTE or 5G NR (or LTE or 1×RTT or LTE or GSM), and separate radios for communicating using each of Wi-Fi and Bluetooth. Other configurations are also possible.

Figure 2:
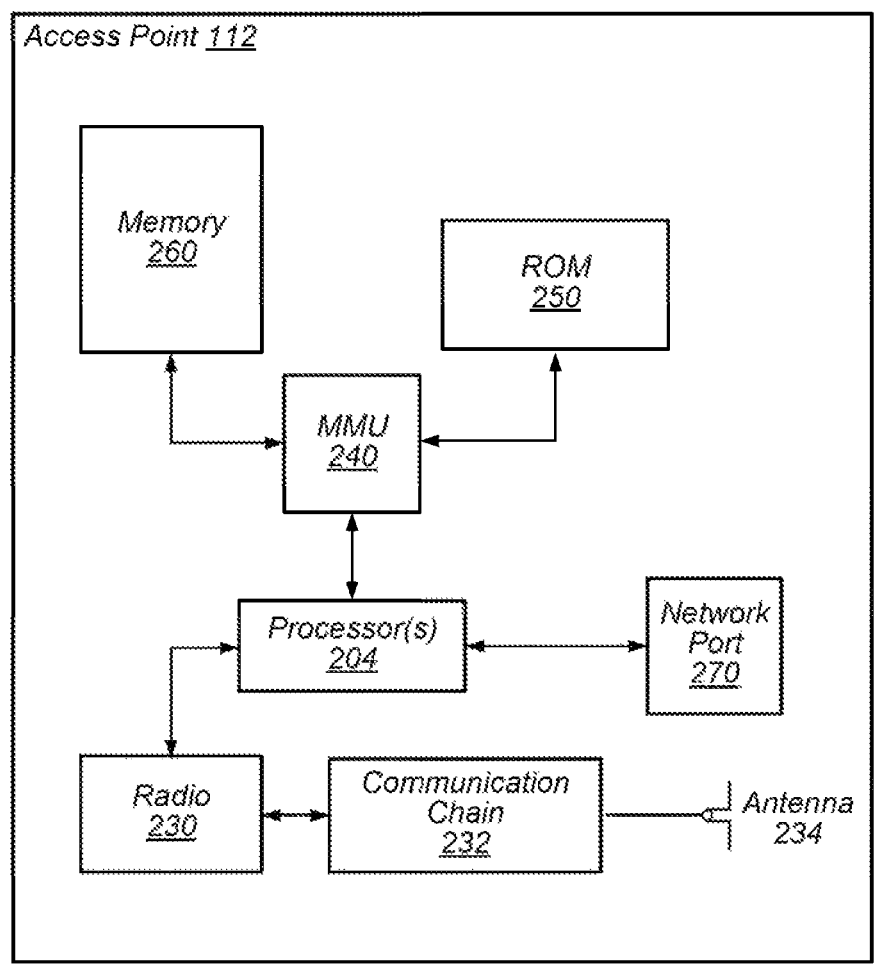
FIG. 2 illustrates an example simplified block diagram of a WLAN Access Point (AP), according to some embodiments.

FIG. 2: Access Point Block Diagram

FIG. 2 illustrates an exemplary block diagram of an access point (AP) 112. It is noted that the block diagram of the AP of FIG. 2 is only one example of a possible system.

As shown, the AP 112 may include processor(s) 204 which may execute program instructions for the AP 112. The processor(s) 204 may also be coupled (directly or indirectly) to memory management unit (MMU) 240, which may be configured to receive addresses from the processor(s) 204 and to translate those addresses to locations in memory (e.g., memory 260 and read only memory (ROM) 250) or to other circuits or devices.

The AP 112 may include at least one network port 270. The network port 270 may be configured to couple to a wired network and provide a plurality of devices, such as UEs 106, access to the Internet. For example, the network port 270 (or an additional network port) may be configured to couple to a local network, such as a home network or an enterprise network. For example, port 270 may be an Ethernet port. The local network may provide connectivity to additional networks, such as the Internet.

The AP 112 may include at least one antenna 234, which may be configured to operate as a wireless transceiver and may be further configured to communicate with UE 106 via wireless communication circuitry 230. The antenna 234 communicates with the wireless communication circuitry 230 via communication chain 232. Communication chain 232 may include one or more receive chains, one or more transmit chains or both. The wireless communication circuitry 230 may be configured to communicate via Wi-Fi or WLAN, e.g., 802.11. The wireless communication circuitry 230 may also, or alternatively, be configured to communicate via various other wireless communication technologies, including, but not limited to, 5G NR, Long-Term Evolution (LTE), LTE Advanced (LTE-A), Global System for Mobile (GSM), Wideband Code Division Multiple Access (WCDMA), CDMA2000, etc., for example when the AP is co-located with a base station in case of a small cell, or in other instances when it may be desirable for the AP 112 to communicate via various different wireless communication technologies.

In some embodiments, as further described below, an AP 112 may be configured to perform methods for beam indication latency reduction, e.g., via symbol level beam sweeping capability reporting and/or a symbol level beam sweeping configuration, as further described herein.

Figure 3:
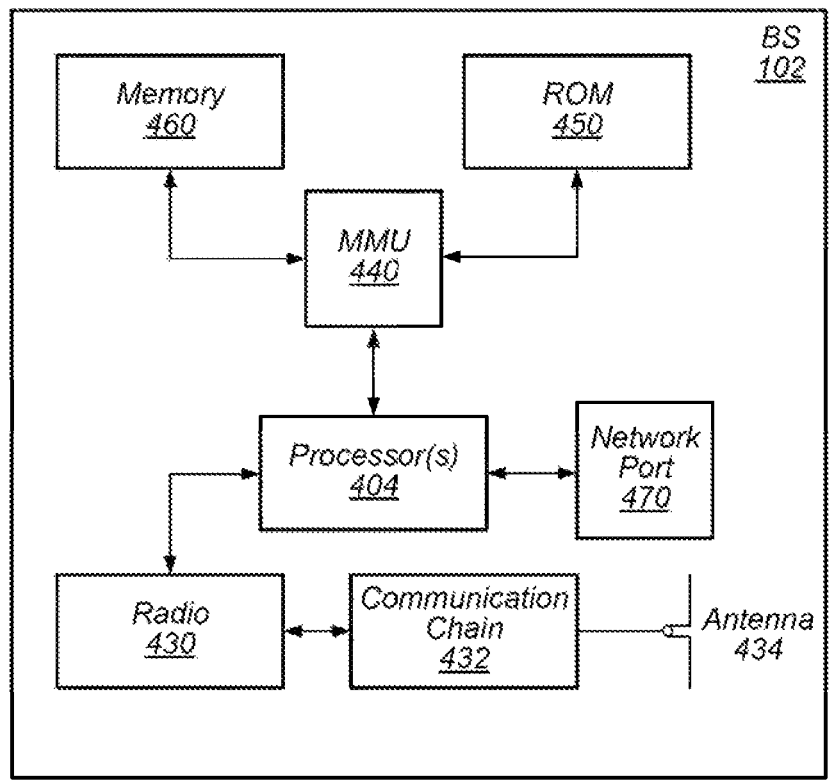
FIG. 3 illustrates an example block diagram of a BS according to some embodiments.

FIG. 3: Block Diagram of a Base Station

FIG. 3 illustrates an example block diagram of a base station 102, according to some embodiments. It is noted that the base station of FIG. 3 is merely one example of a possible base station. As shown, the base station 102 may include processor(s) 404 which may execute program instructions for the base station 102. The processor(s) 404 may also be coupled to memory management unit (MMU) 440, which may be configured to receive addresses from the processor(s) 404 and translate those addresses to locations in memory (e.g., memory 460 and read only memory (ROM) 450) or to other circuits or devices.

The base station 102 may include at least one network port 470. The network port 470 may be configured to couple to a telephone network and provide a plurality of devices, such as UE devices 106, access to the telephone network as described above in FIGS. 1 and 2.

The network port 470 (or an additional network port) may also or alternatively be configured to couple to a cellular network, e.g., a core network of a cellular service provider. The core network may provide mobility related services and/or other services to a plurality of devices, such as UE devices 106. In some cases, the network port 470 may couple to a telephone network via the core network, and/or the core network may provide a telephone network (e.g., among other UE devices serviced by the cellular service provider).

In some embodiments, base station 102 may be a next generation base station, e.g., a 5G New Radio (5G NR) base station, or "gNB". In such embodiments, base station 102 may be connected to a legacy evolved packet core (EPC) network and/or to a NR core (NRC) network. In addition, base station 102 may be considered a 5G NR cell and may include one or more transition and reception points (TRPs). In addition, a UE capable of operating according to 5G NR may be connected to one or more TRPs within one or more gNBs.

The base station 102 may include at least one antenna 434, and possibly multiple antennas. The at least one antenna 434 may be configured to operate as a wireless transceiver and may be further configured to communicate with UE devices 106 via radio 430. The antenna 434 communicates with the radio 430 via communication chain 432. Communication chain 432 may be a receive chain, a transmit chain or both. The radio 430 may be configured to communicate via various wireless communication standards, including, but not limited to, 5G NR, LTE, LTE-A, GSM, UMTS, CDMA2000, Wi-Fi, etc.

The base station 102 may be configured to communicate wirelessly using multiple wireless communication standards. In some instances, the base station 102 may include multiple radios, which may enable the base station 102 to communicate according to multiple wireless communication technologies. For example, as one possibility, the base station 102 may include an LTE radio for performing communication according to LTE as well as a 5G NR radio for performing communication according to 5G NR. In such a case, the base station 102 may be capable of operating as both an LTE base station and a 5G NR base station. As another possibility, the base station 102 may include a multi-mode radio which is capable of performing communications according to any of multiple wireless communication technologies (e.g., 5G NR and Wi-Fi, LTE and Wi-Fi, LTE and UMTS, LTE and CDMA2000, UMTS and GSM, etc.).

As described further subsequently herein, the BS 102 may include hardware and software components for implementing or supporting implementation of features described herein. The processor 404 of the base station 102 may be configured to implement or support implementation of part or all of the methods described herein, e.g., by executing program instructions stored on a memory medium (e.g., a non-transitory computer-readable memory medium). Alternatively, the processor 404 may be configured as a programmable hardware element, such as an FPGA (Field Programmable Gate Array), or as an ASIC (Application Specific Integrated Circuit), or a combination thereof. Alternatively (or in addition) the processor 404 of the BS 102, in conjunction with one or more of the other components 430, 432, 434, 440, 450, 460, 470 may be configured to implement or support implementation of part or all of the features described herein.

In addition, as described herein, processor(s) 404 may be comprised of one or more processing elements. In other words, one or more processing elements may be included in processor(s) 404. Thus, processor(s) 404 may include one or more integrated circuits (ICs) that are configured to perform the functions of processor(s) 404. In addition, each integrated circuit may include circuitry (e.g., first circuitry, second circuitry, etc.) configured to perform the functions of processor(s) 404.

Further, as described herein, radio 430 may be comprised of one or more processing elements. In other words, one or more processing elements may be included in radio 430. Thus, radio 430 may include one or more integrated circuits (ICs) that are configured to perform the functions of radio 430. In addition, each integrated circuit may include circuitry (e.g., first circuitry, second circuitry, etc.) configured to perform the functions of radio 430.

Figure 4:
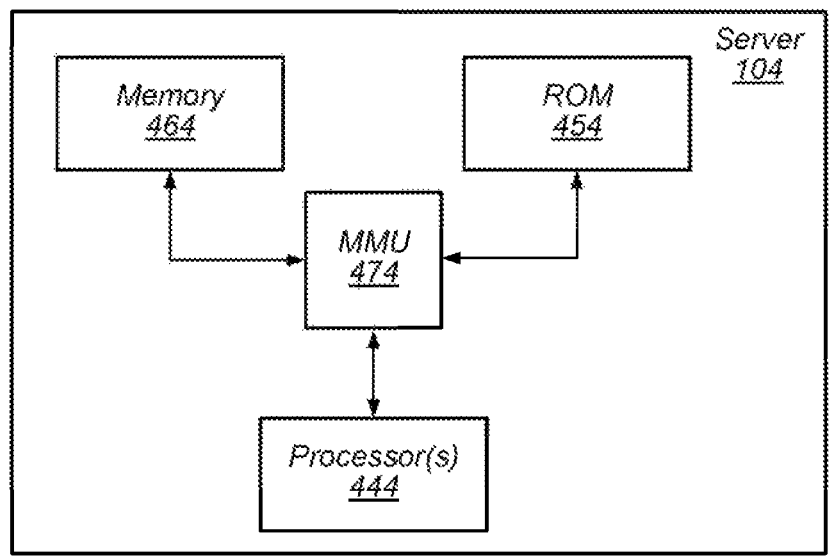
FIG. 4 illustrates an example block diagram of a server according to some embodiments.

FIG. 4: Block Diagram of a Server

FIG. 4 illustrates an example block diagram of a server 104, according to some embodiments. It is noted that the base station of FIG. 4 is merely one example of a possible server. As shown, the server 104 may include processor(s) 444 which may execute program instructions for the server 104. The processor(s) 444 may also be coupled to memory management unit (MMU) 474, which may be configured to receive addresses from the processor(s) 444 and translate those addresses to locations in memory (e.g., memory 464 and read only memory (ROM) 454) or to other circuits or devices.

The server 104 may be configured to provide a plurality of devices, such as base station 102, UE devices 106, and/or UTM 108, access to network functions, e.g., as further described herein.

In some embodiments, the server 104 may be part of a radio access network, such as a 5G New Radio (5G NR) radio access network. In some embodiments, the server 104 may be connected to a legacy evolved packet core (EPC) network and/or to a NR core (NRC) network.

As described further subsequently herein, the server 104 may include hardware and software components for implementing or supporting implementation of features described herein. The processor 444 of the server 104 may be configured to implement or support implementation of part or all of the methods described herein, e.g., by executing program instructions stored on a memory medium (e.g., a non-transitory computer-readable memory medium). Alternatively, the processor 444 may be configured as a programmable hardware element, such as an FPGA (Field Programmable Gate Array), or as an ASIC (Application Specific Integrated Circuit), or a combination thereof. Alternatively (or in addition) the processor 444 of the server 104, in conjunction with one or more of the other components 454, 464, and/or 474 may be configured to implement or support implementation of part or all of the features described herein.

In addition, as described herein, processor(s) 444 may be comprised of one or more processing elements. In other words, one or more processing elements may be included in processor(s) 444. Thus, processor(s) 444 may include one or more integrated circuits (ICs) that are configured to perform the functions of processor(s) 444. In addition, each integrated circuit may include circuitry (e.g., first circuitry, second circuitry, etc.) configured to perform the functions of processor(s) 444.

Figure 5A:
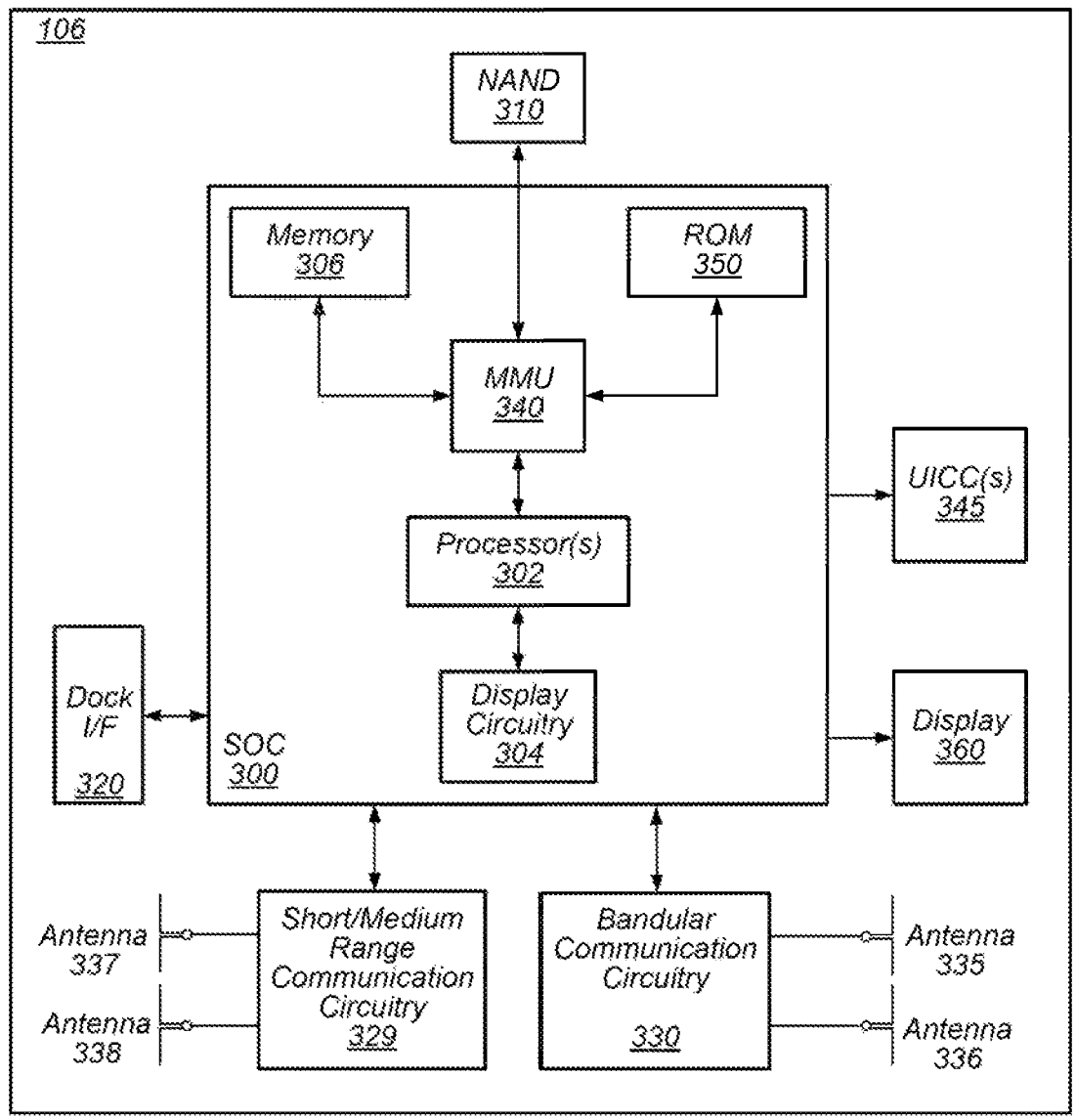
FIG. 5A illustrates an example block diagram of a UE according to some embodiments.

FIG. 5A: Block Diagram of a UE

FIG. 5A illustrates an example simplified block diagram of a communication device 106, according to some embodiments. It is noted that the block diagram of the communication device of FIG. 5A is only one example of a possible communication device. According to embodiments, communication device 106 may be a user equipment (UE) device, a mobile device or mobile station, a wireless device or wireless station, a desktop computer or computing device, a mobile computing device (e.g., a laptop, notebook, or portable computing device), a tablet, an unmanned aerial vehicle (UAV), a UAV controller (UAC) and/or a combination of devices, among other devices. As shown, the communication device 106 may include a set of components 300 configured to perform core functions. For example, this set of components may be implemented as a system on chip (SOC), which may include portions for various purposes. Alternatively, this set of components 300 may be implemented as separate components or groups of components for the various purposes. The set of components 300 may be coupled (e.g., communicatively; directly or indirectly) to various other circuits of the communication device 106.

For example, the communication device 106 may include various types of memory (e.g., including NAND flash 310), an input/output interface such as connector I/F 320 (e.g., for connecting to a computer system; dock; charging station; input devices, such as a microphone, camera, keyboard; output devices, such as speakers; etc.), the display 360, which may be integrated with or external to the communication device 106, and cellular communication circuitry 330 such as for 5G NR, LTE, GSM, etc., and short to medium range wireless communication circuitry 329 (e.g., Bluetooth M and WLAN circuitry). In some embodiments, communication device 106 may include wired communication circuitry (not shown), such as a network interface card, e.g., for Ethernet.

The cellular communication circuitry 330 may couple (e.g., communicatively; directly or indirectly) to one or more antennas, such as antennas 335 and 336 as shown. The short to medium range wireless communication circuitry 329 may also couple (e.g., communicatively; directly or indirectly) to one or more antennas, such as antennas 337 and 338 as shown. Alternatively, the short to medium range wireless communication circuitry 329 may couple (e.g., communicatively; directly or indirectly) to the antennas 335 and 336 in addition to, or instead of, coupling (e.g., communicatively; directly or indirectly) to the antennas 337 and 338. The short to medium range wireless communication circuitry 329 and/or cellular communication circuitry 330 may include multiple receive chains and/or multiple transmit chains for receiving and/or transmitting multiple spatial streams, such as in a multiple-input multiple output (MIMO) configuration.

In some embodiments, as further described below, cellular communication circuitry 330 may include dedicated receive chains (including and/or coupled to, e.g., communicatively; directly or indirectly. dedicated processors and/or radios) for multiple RATs (e.g., a first receive chain for LTE and a second receive chain for 5G NR). In addition, in some embodiments, cellular communication circuitry 330 may include a single transmit chain that may be switched between radios dedicated to specific RATs. For example, a first radio may be dedicated to a first RAT, e.g., LTE, and may be in communication with a dedicated receive chain and a transmit chain shared with an additional radio, e.g., a second radio that may be dedicated to a second RAT, e.g., 5G NR, and may be in communication with a dedicated receive chain and the shared transmit chain.

The communication device 106 may also include and/or be configured for use with one or more user interface elements. The user interface elements may include any of various elements, such as display 360 (which may be a touchscreen display), a keyboard (which may be a discrete keyboard or may be implemented as part of a touchscreen display), a mouse, a microphone and/or speakers, one or more cameras, one or more buttons, and/or any of various other elements capable of providing information to a user and/or receiving or interpreting user input.

The communication device 106 may further include one or more smart cards 345 that include SIM (Subscriber Identity Module) functionality, such as one or more UICC(s) (Universal Integrated Circuit Card(s)) cards 345. Note that the term "SIM" or "SIM entity" is intended to include any of various types of SIM implementations or SIM functionality, such as the one or more UICC(s) cards 345, one or more cUICCs, one or more cSIMs, either removable or embedded, etc. In some embodiments, the UE 106 may include at least two SIMs. Each SIM may execute one or more SIM applications and/or otherwise implement SIM functionality. Thus, each SIM may be a single smart card that may be embedded, e.g., may be soldered onto a circuit board in the UE 106, or each SIM 310 may be implemented as a removable smart card. Thus the SIM(s) may be one or more removable smart cards (such as UICC cards, which are sometimes referred to as "SIM cards"), and/or the SIMs 310 may be one or more embedded cards (such as embedded UICCs (eUICCs), which are sometimes referred to as "eSIMs" or "eSIM cards"). In some embodiments (such as when the SIM(s) include an eUICC), one or more of the SIM(s) may implement embedded SIM (eSIM) functionality; in such an embodiment, a single one of the SIM(s) may execute multiple SIM applications. Each of the SIMs may include components such as a processor and/or a memory; instructions for performing SIM/eSIM functionality may be stored in the memory and executed by the processor. In some embodiments, the UE 106 may include a combination of removable smart cards and fixed/non-removable smart cards (such as one or more eUICC cards that implement eSIM functionality), as desired. For example, the UE 106 may comprise two embedded SIMs, two removable SIMs, or a combination of one embedded SIMs and one removable SIMs. Various other SIM configurations are also contemplated.

As noted above, in some embodiments, the UE 106 may include two or more SIMs. The inclusion of two or more SIMs in the UE 106 may allow the UE 106 to support two different telephone numbers and may allow the UE 106 to communicate on corresponding two or more respective networks. For example, a first SIM may support a first RAT such as LTE, and a second SIM 310 support a second RAT such as 5G NR. Other implementations and RATs are of course possible. In some embodiments, when the UE 106 comprises two SIMs, the UE 106 may support Dual SIM Dual Active (DSDA) functionality. The DSDA functionality may allow the UE 106 to be simultaneously connected to two networks (and use two different RATs) at the same time, or to simultaneously maintain two connections supported by two different SIMs using the same or different RATs on the same or different networks. The DSDA functionality may also allow the UE 106 to simultaneously receive voice calls or data traffic on either phone number. In certain embodiments the voice call may be a packet switched communication. In other words, the voice call may be received using voice over LTE (VoLTE) technology and/or voice over NR (VoNR) technology. In some embodiments, the UE 106 may support Dual SIM Dual Standby (DSDS) functionality. The DSDS functionality may allow either of the two SIMs in the UE 106 to be on standby waiting for a voice call and/or data connection. In DSDS, when a call/data is established on one SIM, the other SIM is no longer active. In some embodiments, DSDx functionality (either DSDA or DSDS functionality) may be implemented with a single SIM (e.g., a cUICC) that executes multiple SIM applications for different carriers and/or RATs.

As shown, the SOC 300 may include processor(s) 302, which may execute program instructions for the communication device 106 and display circuitry 304, which may perform graphics processing and provide display signals to the display 360. The processor(s) 302 may also be coupled to memory management unit (MMU) 340, which may be configured to receive addresses from the processor(s) 302 and translate those addresses to locations in memory (e.g., memory 306, read only memory (ROM) 350, NAND flash memory 310) and/or to other circuits or devices, such as the display circuitry 304, short to medium range wireless communication circuitry 329, cellular communication circuitry 330, connector I/F 320, and/or display 360. The MMU 340 may be configured to perform memory protection and page table translation or set up. In some embodiments, the MMU 340 may be included as a portion of the processor(s) 302.

As noted above, the communication device 106 may be configured to communicate using wireless and/or wired communication circuitry. The communication device 106 may be configured to perform methods for beam indication latency reduction, e.g., via symbol level beam sweeping capability reporting and/or a symbol level beam sweeping configuration, as further described herein.

As described herein, the communication device 106 may include hardware and software components for implementing the above features for a communication device 106 to communicate a scheduling profile for power savings to a network. The processor 302 of the communication device 106 may be configured to implement part or all of the features described herein, e.g., by executing program instructions stored on a memory medium (e.g., a non-transitory computer-readable memory medium). Alternatively (or in addition), processor 302 may be configured as a programmable hardware element, such as an FPGA (Field Programmable Gate Array), or as an ASIC (Application Specific Integrated Circuit). Alternatively (or in addition) the processor 302 of the communication device 106, in conjunction with one or more of the other components 300, 304, 306, 310, 320, 329, 330, 340, 345, 350, 360 may be configured to implement part or all of the features described herein.

In addition, as described herein, processor 302 may include one or more processing elements. Thus, processor 302 may include one or more integrated circuits (ICs) that are configured to perform the functions of processor 302. In addition, each integrated circuit may include circuitry (e.g., first circuitry, second circuitry, etc.) configured to perform the functions of processor(s) 302.

Further, as described herein, cellular communication circuitry 330 and short to medium range wireless communication circuitry 329 may each include one or more processing elements. In other words, one or more processing elements may be included in cellular communication circuitry 330 and, similarly, one or more processing elements may be included in short to medium range wireless communication circuitry 329. Thus, cellular communication circuitry 330 may include one or more integrated circuits (ICs) that are configured to perform the functions of cellular communication circuitry 330. In addition, each integrated circuit may include circuitry (e.g., first circuitry, second circuitry, etc.) configured to perform the functions of cellular communication circuitry 330. Similarly, the short to medium range wireless communication circuitry 329 may include one or more ICs that are configured to perform the functions of short to medium range wireless communication circuitry 329. In addition, each integrated circuit may include circuitry (e.g., first circuitry, second circuitry, etc.) configured to perform the functions of short to medium range wireless communication circuitry 329.

Figure 5B:
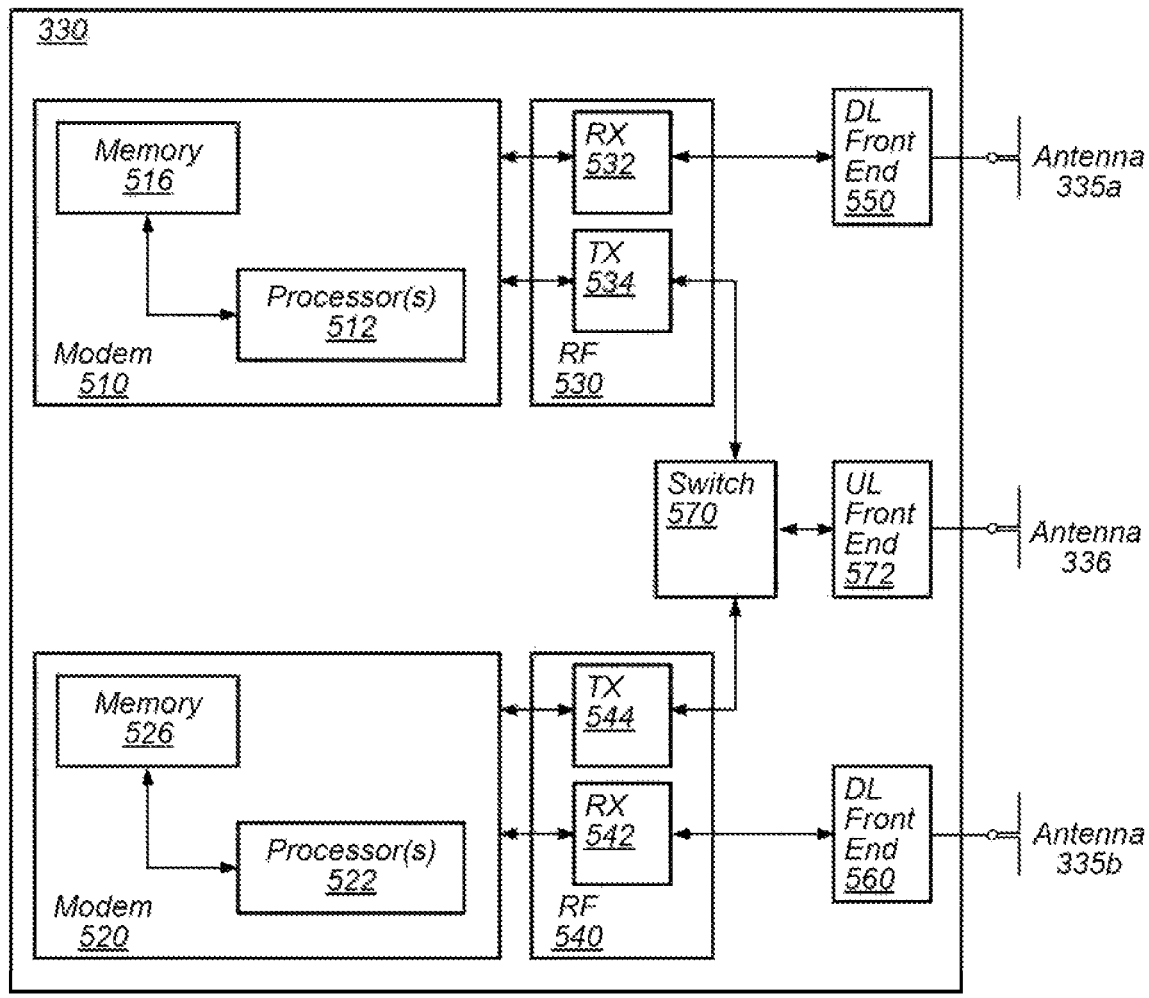
FIG. 5B illustrates an example block diagram of cellular communication circuitry, according to some embodiments.

FIG. 5B: Block Diagram of Cellular Communication Circuitry

FIG. 5B illustrates an example simplified block diagram of cellular communication circuitry, according to some embodiments. It is noted that the block diagram of the cellular communication circuitry of FIG. 5B is only one example of a possible cellular communication circuit. According to embodiments, cellular communication circuitry 330 may be included in a communication device, such as communication device 106 described above. As noted above, communication device 106 may be a user equipment (UE) device, a mobile device or mobile station, a wireless device or wireless station, a desktop computer or computing device, a mobile computing device (e.g., a laptop, notebook, or portable computing device), a tablet and/or a combination of devices, among other devices.

The cellular communication circuitry 330 may couple (e.g., communicatively; directly or indirectly) to one or more antennas, such as antennas 335a-b and 336 as shown (in FIG. 3). In some embodiments, cellular communication circuitry 330 may include dedicated receive chains (including and/or coupled to, e.g., communicatively; directly or indirectly. dedicated processors and/or radios) for multiple RATs (e.g., a first receive chain for LTE and a second receive chain for 5G NR). For example, as shown in FIG. 5, cellular communication circuitry 330 may include a modem 510 and a modem 520. Modem 510 may be configured for communications according to a first RAT, e.g., such as LTE or LTE-A, and modem 520 may be configured for communications according to a second RAT, e.g., such as 5G NR.

As shown, modem 510 may include one or more processors 512 and a memory 516 in communication with processors 512. Modem 510 may be in communication with a radio frequency (RF) front end 530. RF front end 530 may include circuitry for transmitting and receiving radio signals. For example, RF front end 530 may include receive circuitry (RX) 532 and transmit circuitry (TX) 534. In some embodiments, receive circuitry 532 may be in communication with downlink (DL) front end 550, which may include circuitry for receiving radio signals via antenna 335a.

Similarly, modem 520 may include one or more processors 522 and a memory 526 in communication with processors 522. Modem 520 may be in communication with an RF front end 540. RF front end 540 may include circuitry for transmitting and receiving radio signals. For example, RF front end 540 may include receive circuitry 542 and transmit circuitry 544. In some embodiments, receive circuitry 542 may be in communication with DL front end 560, which may include circuitry for receiving radio signals via antenna 335b.

In some embodiments, a switch 570 may couple transmit circuitry 534 to uplink (UL) front end 572. In addition, switch 570 may couple transmit circuitry 544 to UL front end 572. UL front end 572 may include circuitry for transmitting radio signals via antenna 336. Thus, when cellular communication circuitry 330 receives instructions to transmit according to the first RAT (e.g., as supported via modem 510), switch 570 may be switched to a first state that allows modem 510 to transmit signals according to the first RAT (e.g., via a transmit chain that includes transmit circuitry 534 and UL front end 572). Similarly, when cellular communication circuitry 330 receives instructions to transmit according to the second RAT (e.g., as supported via modem 520), switch 570 may be switched to a second state that allows modem 520 to transmit signals according to the second RAT (e.g., via a transmit chain that includes transmit circuitry 544 and UL front end 572).

In some embodiments, the cellular communication circuitry 330 may be configured to perform methods beam indication latency reduction, e.g., via symbol level beam sweeping capability reporting and/or a symbol level beam sweeping configuration, as further described herein.

As described herein, the modem 510 may include hardware and software components for implementing the above features or for time division multiplexing UL data for NSA NR operations, as well as the various other techniques described herein. The processors 512 may be configured to implement part or all of the features described herein, e.g., by executing program instructions stored on a memory medium (e.g., a non-transitory computer-readable memory medium). Alternatively (or in addition), processor 512 may be configured as a programmable hardware element, such as an FPGA (Field Programmable Gate Array), or as an ASIC (Application Specific Integrated Circuit). Alternatively (or in addition) the processor 512, in conjunction with one or more of the other components 530, 532, 534, 550, 570, 572, 335 and 336 may be configured to implement part or all of the features described herein.

In addition, as described herein, processors 512 may include one or more processing elements. Thus, processors 512 may include one or more integrated circuits (ICs) that are configured to perform the functions of processors 512. In addition, each integrated circuit may include circuitry (e.g., first circuitry, second circuitry, etc.) configured to perform the functions of processors 512.

As described herein, the modem 520 may include hardware and software components for implementing the above features for communicating a scheduling profile for power savings to a network, as well as the various other techniques described herein. The processors 522 may be configured to implement part or all of the features described herein, e.g., by executing program instructions stored on a memory medium (e.g., a non-transitory computer-readable memory medium). Alternatively (or in addition), processor 522 may be configured as a programmable hardware element, such as an FPGA (Field Programmable Gate Array), or as an ASIC (Application Specific Integrated Circuit). Alternatively (or in addition) the processor 522, in conjunction with one or more of the other components 540, 542, 544, 550, 570, 572, 335 and 336 may be configured to implement part or all of the features described herein.

In addition, as described herein, processors 522 may include one or more processing elements. Thus, processors 522 may include one or more integrated circuits (ICs) that are configured to perform the functions of processors 522. In addition, each integrated circuit may include circuitry (e.g., first circuitry, second circuitry, etc.) configured to perform the functions of processors 522.

Figure 6A:
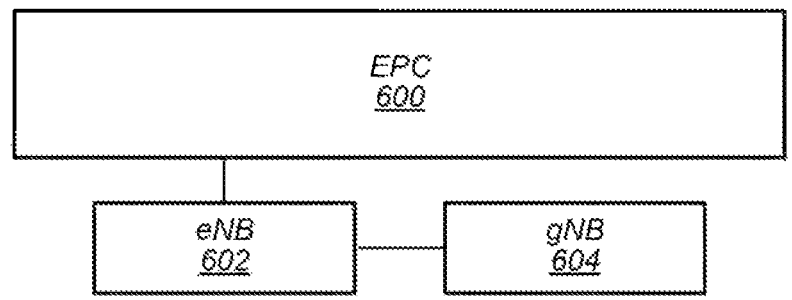
FIG. 6A illustrates an example of connections between an EPC network, an LTE base station (eNB), and a 5G NR base station (gNB).
Figure 6B:
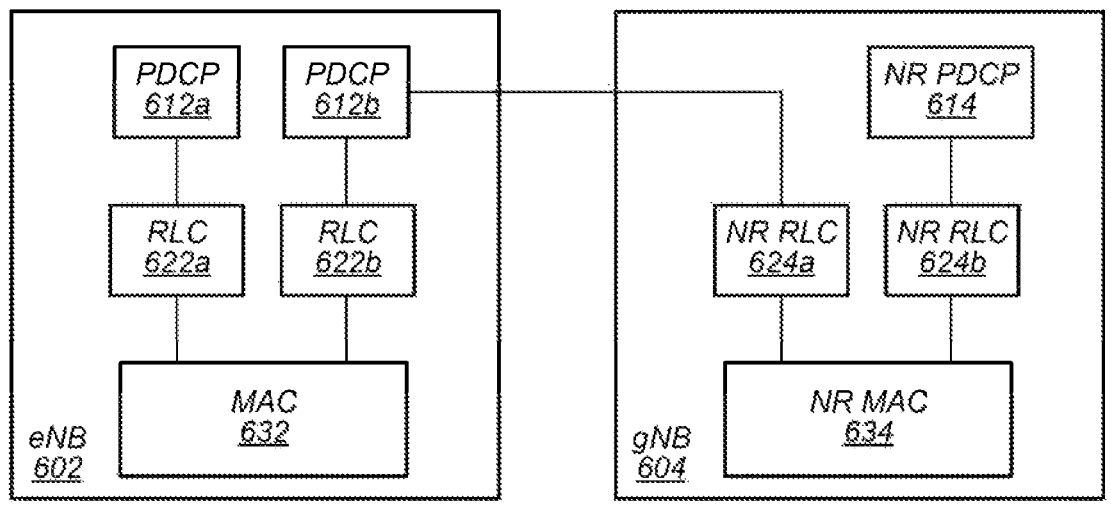
FIG. 6B illustrates an example of a protocol stack for an eNB and a gNB.

FIGS. 6A and 6B: 5G NR Architecture With LTE

In some implementations, fifth generation (5G) wireless communication will initially be deployed concurrently with current wireless communication standards (e.g., LTE). For example, dual connectivity between LTE and 5G new radio (5G NR or NR) has been specified as part of the initial deployment of NR. Thus, as illustrated in FIGS. 6A-B, evolved packet core (EPC) network 600 may continue to communicate with current LTE base stations (e.g., eNB 602). In addition, eNB 602 may be in communication with a 5G NR base station (e.g., gNB 604) and may pass data between the EPC network 600 and gNB 604. Thus, EPC network 600 may be used (or reused) and gNB 604 may serve as extra capacity for UEs, e.g., for providing increased downlink throughput to UEs. In other words, LTE may be used for control plane signaling and NR may be used for user plane signaling. Thus, LTE may be used to establish connections to the network and NR may be used for data services.

FIG. 6B illustrates a proposed protocol stack for eNB 602 and gNB 604. As shown, eNB 602 may include a medium access control (MAC) layer 632 that interfaces with radio link control (RLC) layers 622a-b. RLC layer 622a may also interface with packet data convergence protocol (PDCP) layer 612a and RLC layer 622b may interface with PDCP layer 612b. Similar to dual connectivity as specified in LTE-Advanced Release 12, PDCP layer 612a may interface via a master cell group (MCG) bearer with EPC network 600 whereas PDCP layer 612b may interface via a split bearer with EPC network 600.

Additionally, as shown, gNB 604 may include a MAC layer 634 that interfaces with RLC layers 624a-b. RLC layer 624a may interface with PDCP layer 612b of eNB 602 via an $X_2$ interface for information exchange and/or coordination (e.g., scheduling of a UE) between eNB 602 and gNB 604. In addition, RLC layer 624b may interface with PDCP layer 614. Similar to dual connectivity as specified in LTE-Advanced Release 12, PDCP layer 614 may interface with EPC network 600 via a secondary cell group (SCG) bearer. Thus, eNB 602 may be considered a master node (MeNB) while gNB 604 may be considered a secondary node (SgNB). In some scenarios, a UE may be required to maintain a connection to both an MeNB and a SgNB. In such scenarios, the MeNB may be used to maintain a radio resource control (RRC) connection to an EPC while the SgNB may be used for capacity (e.g., additional downlink and/or uplink throughput).

Figure 7A:
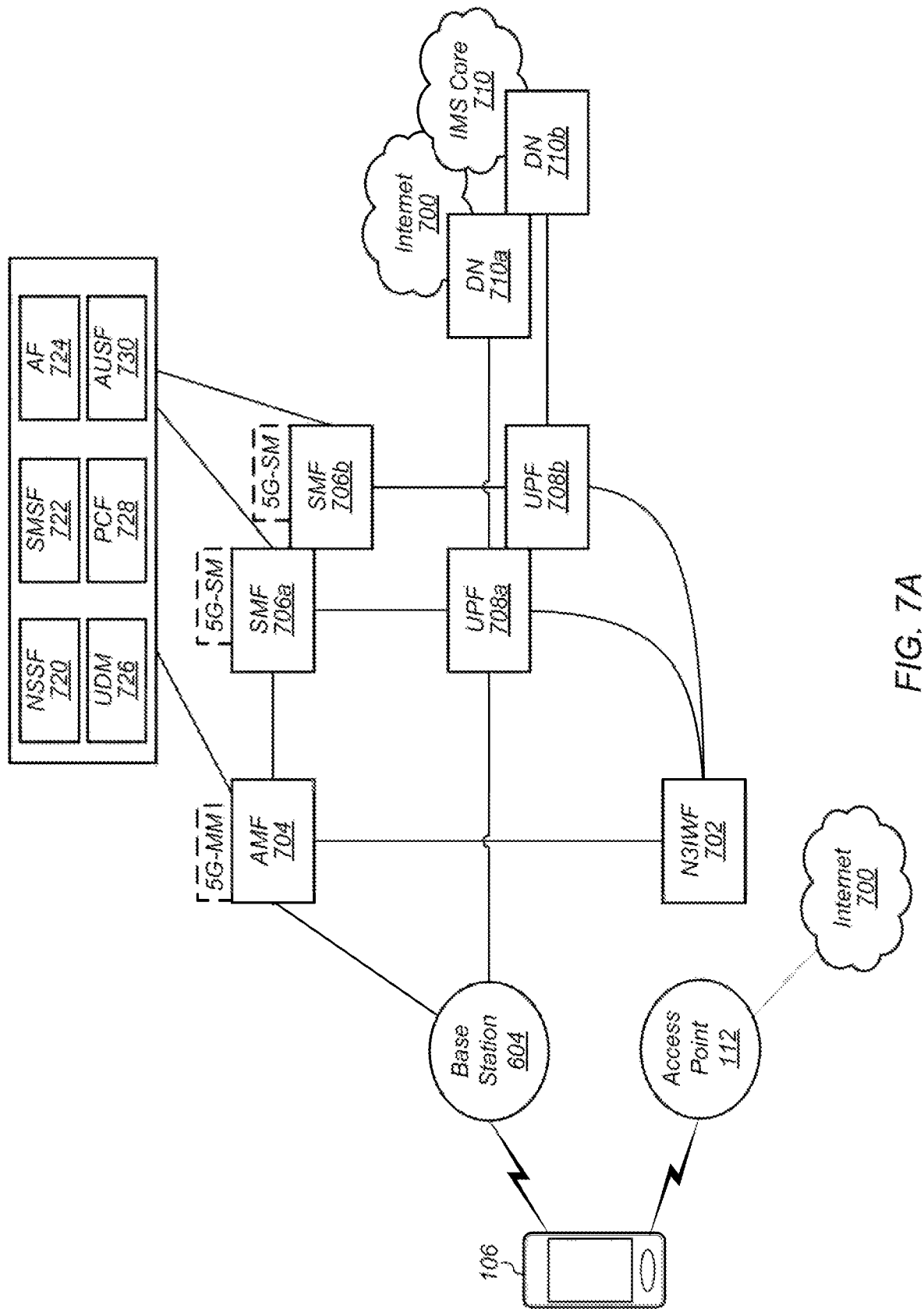
FIG. 7A illustrates an example of a 5G network architecture that incorporates both 3GPP (e.g., cellular) and non-3GPP (e.g., non-cellular) access to the 5G CN, according to some embodiments.
Figure 7B:
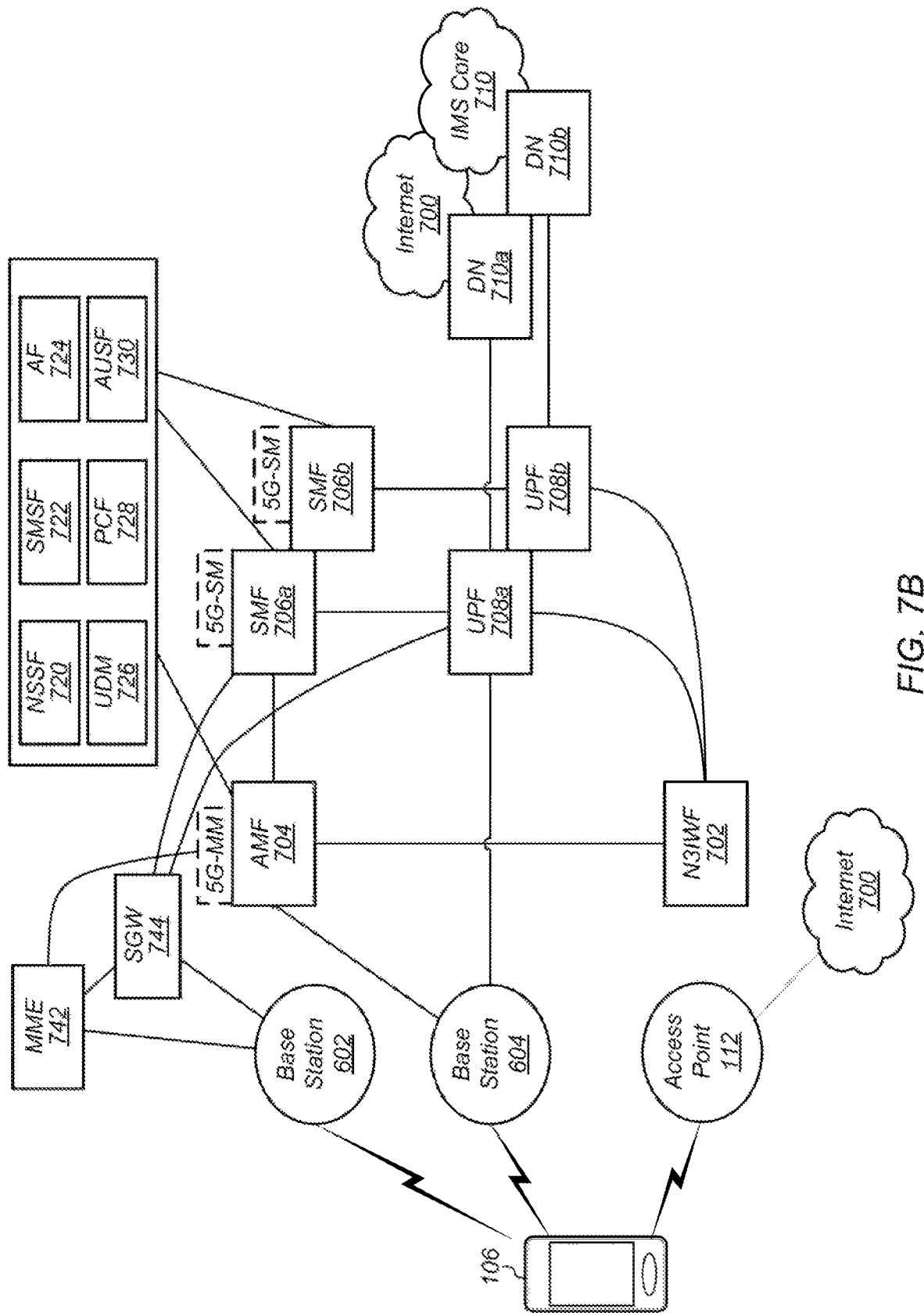
FIG. 7B illustrates an example of a 5G network architecture that incorporates both dual 3GPP (e.g., LTE and 5G NR) access and non-3GPP access to the 5G CN, according to some embodiments.
Figure 8:
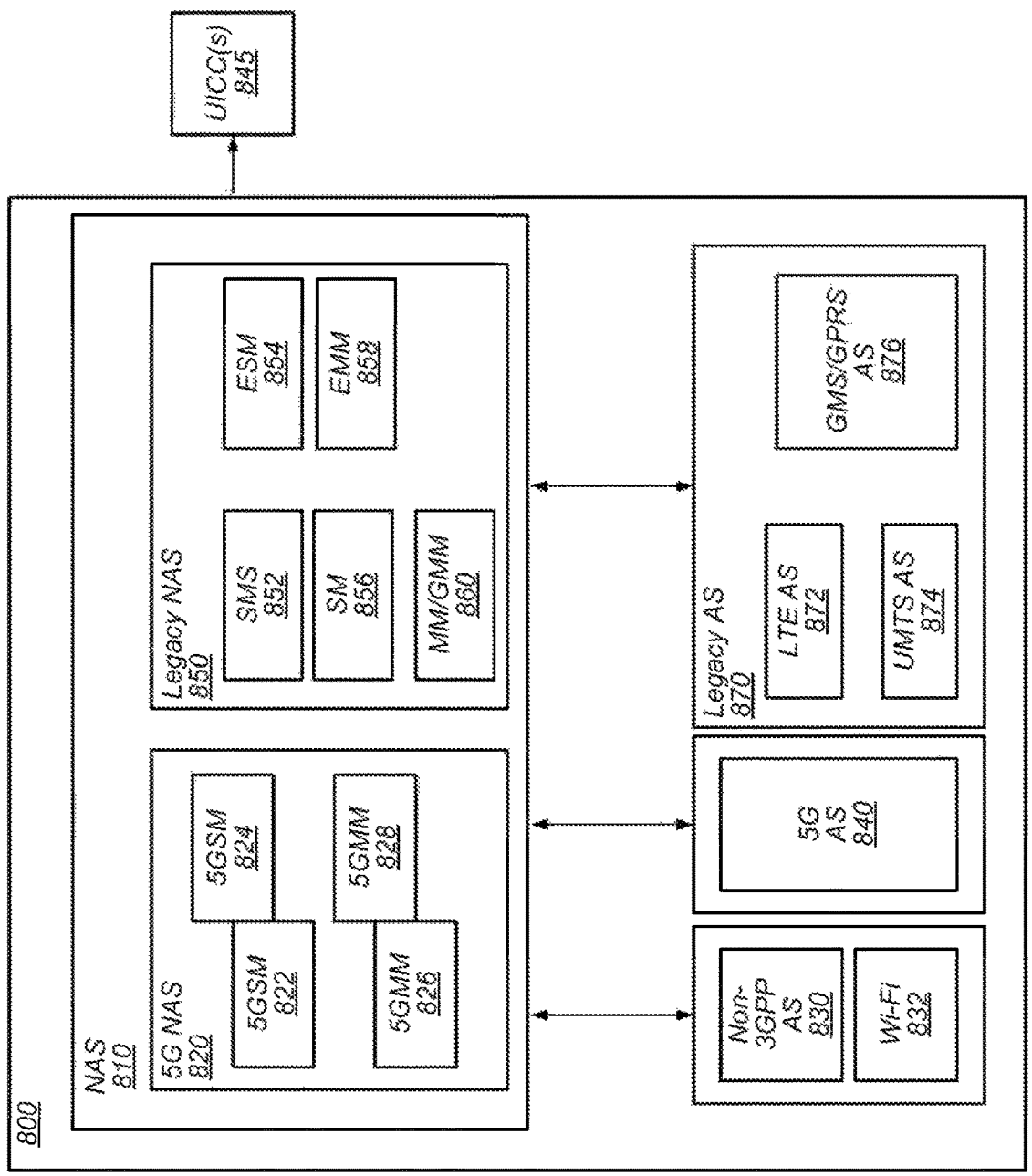
FIG. 8 illustrates an example of a baseband processor architecture for a UE, according to some embodiments.

FIGS. 7A, 7B and 8: 5G Core Network Architecture—Interworking With Wi-Fi In some embodiments, the 5G core network (CN) may be accessed via (or through) a cellular connection/interface (e.g., via a 3GPP communication architecture/protocol) and a non-cellular connection/interface (e.g., a non-3GPP access architecture/protocol such as Wi-Fi connection). FIG. 7A illustrates an example of a 5G network architecture that incorporates both 3GPP (e.g., cellular) and non-3GPP (e.g., non-cellular) access to the 5G CN, according to some embodiments. As shown, a user equipment device (e.g., such as UE 106) may access the 5G CN through both a radio access network (RAN, e.g., such as gNB or base station 604) and an access point, such as AP 112. The AP 112 may include a connection to the Internet 700 as well as a connection to a non-3GPP inter-working function (N3IWF) 702 network entity. The N3IWF may include a connection to a core access and mobility management function (AMF) 704 of the 5G CN. The AMF 704 may include an instance of a 5G mobility management (5G MM) function associated with the UE 106. In addition, the RAN (e.g., gNB 604) may also have a connection to the AMF 704. Thus, the 5G CN may support unified authentication over both connections as well as allow simultaneous registration for UE 106 access via both gNB 604 and AP 112. As shown, the AMF 704 may include one or more functional entities associated with the 5G CN (e.g., network slice selection function (NSSF) 720, short message service function (SMSF) 722, application function (AF) 724, unified data management (UDM) 726, policy control function (PCF) 728, and/or authentication server function (AUSF) 730). Note that these functional entities may also be supported by a session management function (SMF) 706a and an SMF 706b of the 5G CN. The AMF 706 may be connected to (or in communication with) the SMF 706*a*. Further, the gNB 604 may in communication with (or connected to) a user plane function (UPF) 708*a* that may also be communication with the SMF 706*a*. Similarly, the N3IWF 702 may be communicating with a UPF 708*b* that may also be communicating with the SMF 706*b*. Both UPFs may be communicating with the data network (e.g., DN 710*a* and 710*b*) and/or the Internet 700 and Internet Protocol (IP) Multimedia Subsystem/IP Multimedia Core Network Subsystem (IMS) core network 710.

FIG. 7B illustrates an example of a 5G network architecture that incorporates both dual 3GPP (e.g., LTE and 5G NR) access and non-3GPP access to the 5G CN, according to some embodiments. As shown, a user equipment device (e.g., such as UE 106) may access the 5G CN through both a radio access network (RAN, e.g., such as gNB or base station 604 or eNB or base station 602) and an access point, such as AP 112. The AP 112 may include a connection to the Internet 700 as well as a connection to the N3IWF 702 network entity. The N3IWF may include a connection to the AMF 704 of the 5G CN. The AMF 704 may include an instance of the 5G MM function associated with the UE 106. In addition, the RAN (e.g., gNB 604) may also have a connection to the AMF 704. Thus, the 5G CN may support unified authentication over both connections as well as allow simultaneous registration for UE 106 access via both gNB 604 and AP 112. In addition, the 5G CN may support dual-registration of the UE on both a legacy network (e.g., LTE via base station 602) and a 5G network (e.g., via base station 604). As shown, the base station 602 may have connections to a mobility management entity (MME) 742 and a serving gateway (SGW) 744. The MME 742 may have connections to both the SGW 744 and the AMF 704. In addition, the SGW 744 may have connections to both the SMF 706*a* and the UPF 708*a*. As shown, the AMF 704 may include one or more functional entities associated with the 5G CN (e.g., NSSF 720, SMSF 722, AF 724, UDM 726, PCF 728, and/or AUSF 730). Note that UDM 726 may also include a home subscriber server (HSS) function and the PCF may also include a policy and charging rules function (PCRF). Note further that these functional entities may also be supported by the SMF 706*a* and the SMF 706*b* of the 5G CN. The AMF 706 may be connected to (or in communication with) the SMF 706*a*. Further, the gNB 604 may in communication with (or connected to) the UPF 708*a* that may also be communication with the SMF 706*a*. Similarly, the N3IWF 702 may be communicating with a UPF 708*b* that may also be communicating with the SMF 706*b*. Both UPFs may be communicating with the data network (e.g., DN 710*a* and 710*b*) and/or the Internet 700 and IMS core network 710.

Note that in various embodiments, one or more of the above described network entities may be configured to perform methods to improve security checks in a 5G NR network, including mechanisms beam indication latency reduction, e.g., via symbol level beam sweeping capability reporting and/or a symbol level beam sweeping configuration, e.g., as further described herein.

FIG. 8 illustrates an example of a baseband processor architecture for a UE (e.g., such as UE 106), according to some embodiments. The baseband processor architecture 800 described in FIG. 8 may be implemented on one or more radios (e.g., radios 329 and/or 330 described above) or modems (e.g., modems 510 and/or 520) as described above. As shown, the non-access stratum (NAS) 810 may include a 5G NAS 820 and a legacy NAS 850. The legacy NAS 850 may include a communication connection with a legacy access stratum (AS) 870. The 5G NAS 820 may include communication connections with both a 5G AS 840 and a non-3GPP AS 830 and Wi-Fi AS 832. The 5G NAS 820 may include functional entities associated with both access stratums. Thus, the 5G NAS 820 may include multiple 5G MM entities 826 and 828 and 5G session management (SM) entities 822 and 824. The legacy NAS 850 may include functional entities such as short message service (SMS) entity 852, evolved packet system (EPS) session management (ESM) entity 854, session management (SM) entity 856, EPS mobility management (EMM) entity 858, and mobility management (MM)/GPRS mobility management (GMM) entity 860. In addition, the legacy AS 870 may include functional entities such as LTE AS 872, UMTS AS 874, and/or GSM/GPRS AS 876.

Thus, the baseband processor architecture 800 allows for a common 5G-NAS for both 5G cellular and non-cellular (e.g., non-3GPP access). Note that as shown, the 5G MM may maintain individual connection management and registration management state machines for each connection. Additionally, a device (e.g., UE 106) may register to a single PLMN (e.g., 5G CN) using 5G cellular access as well as non-cellular access. Further, it may be possible for the device to be in a connected state in one access and an idle state in another access and vice versa. Finally, there may be common 5G-MM procedures (e.g., registration, de-registration, identification, authentication, as so forth) for both accesses.

Note that in various embodiments, one or more of the above described functional entities of the 5G NAS and/or 5G AS may be configured to perform methods beam indication latency reduction, e.g., via symbol level beam sweeping capability reporting and/or a symbol level beam sweeping configuration, e.g., as further described herein.

Beam Indication Latency Reduction

In current implementations, such as 3GPP Release 15, a downlink beam indication may be based on a transmission configuration indication (TCI) and different synchronization signal block (SSB)/channel state information reference signal (CSI-RS) resources can be configured in a TCI as a quasi-co-location (QCL) source for the downlink beam indication. In addition, latency for a TCI indication may be determined by a known/unknown status for the TCI, e.g., as defined in 3GPP TS 38.133 V15.10.0 sections 8.10.3 and 8.10.4. For example, for a known TCI, latency may include a delay to apply control signaling (e.g., medium access control (MAC) control element or radio resource control (RRC) signaling) for the TCI indication. In addition, for an unknown TCI, latency may include a delay for UE beam refinement in addition to a delay to apply control signaling for the TCI indication. Further, a TCI can be determined as a "known TCI" when conditions as defined in 3GPP TS 38.133 V15.10.0 section 8.10.2 are satisfied. These conditions require that a last beam report for the TCI is within a time window, that the UE has at least 1 report for the TCI, that signal to noise ratio (SNR) for the TCI is above −3 decibels (dB). A TCI will be considered unknown if any at least one of these conditions is not satisfied.

In current implementations, such as 3GPP Release 15, a delay for UE beam refinement when a TCI is unknown is defined by 3GPP TS 38.133 V15.10.0. In particular, Table 9.5.4.1-2 defines a delay for SSB and Table 9.5.4.2-2 defines a delay for CSI-RS. The delay as defined in these tables includes a variable, N, that reflects a number of receive beams and a variable, M, which relates to potential layer 1 (L1) filtering for reference signal received power (RSRP)

measurement. Note that N may be predefined as eight receive beams for SSB with an assumption that a UE would apply one beam per SSB.

Figure 9:
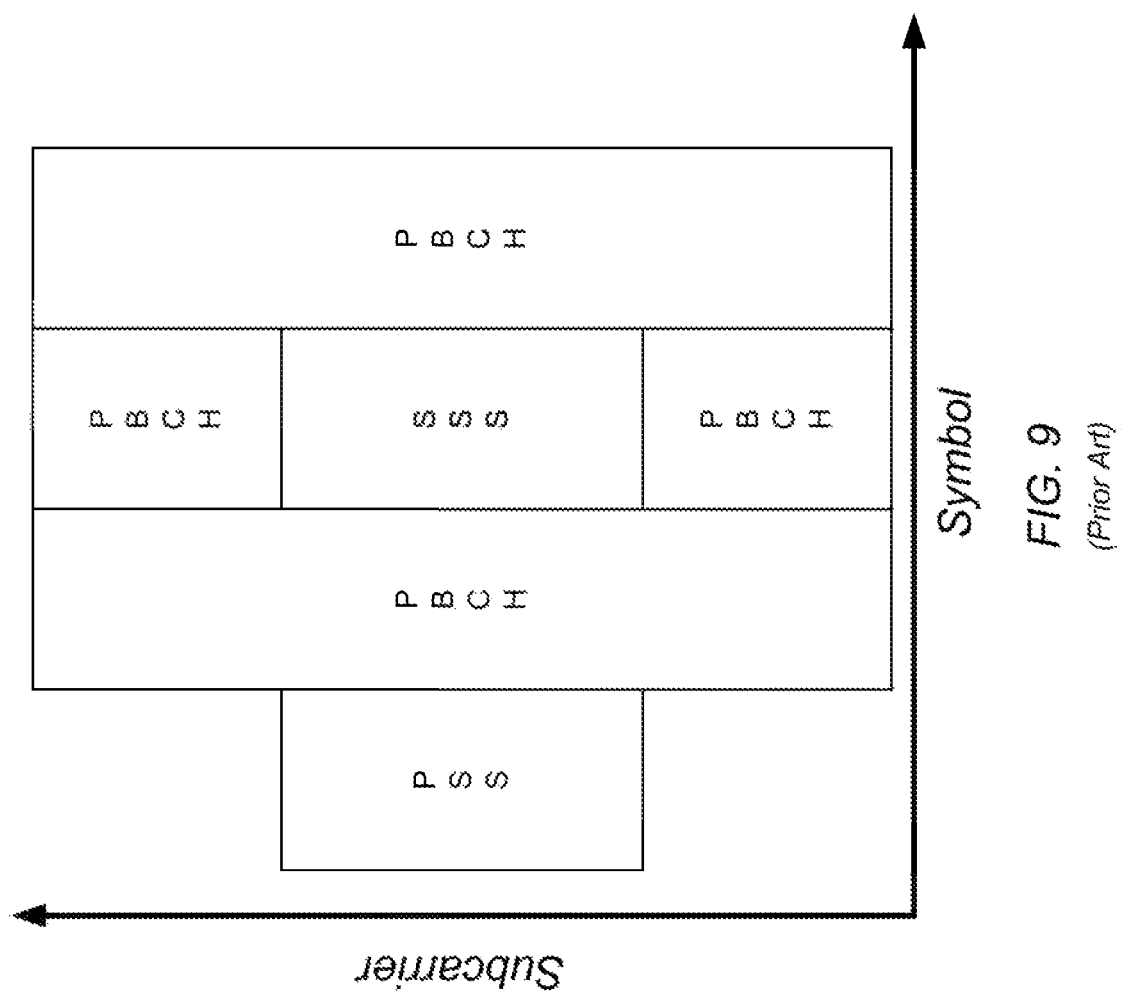
FIG. 9 illustrates an SSB architecture.

However, a UE may be able to (and/or have capability to) attempt to receive an SSB using multiple receive beams. For example, FIG. 9 illustrates an SSB architecture. As shown, an SSB includes both multiple symbols and multiple subcarriers. As shown, a primary synchronization symbol (PSS) may be adjacent to a symbol carrying a physical broadcast channel (PBCH) which may include more subcarriers than the PSS. A symbol adjacent to the PBCH symbol may include subcarriers carrying the PBCH as well as subcarriers carrying a secondary synchronization signal (SSS). Further, a symbol adjacent to the symbol carrying the PBCH and SSS may include subcarriers carrying the PBCH channel. For such an SSB architecture, the UE may apply different receive beams to receive different symbols of the SSB. Additionally, the UE may measure RSRP based on demodulation reference signals (DMRS) of the PBCH and SSS. Note that energy per resource element (EPRE) may be the same for PBCH and SSS. However, in such an SSB architecture, the UE may also be able to measure RSRP from the PSS with interference cancelation, but the power offset between PSS and SSS/DMRS is unknown by the UE.

Embodiments described herein provide systems, methods, and mechanisms for reduction of beam indication latency. In some embodiments, control signaling between a UE, such as UE 106, and a base station, such as base station 102, may be introduced to reduce a latency of beam indication. In some embodiments, both the base station and the UE may maintain a common understanding of a number of UE beams applied to an SSB. Additionally, in some embodiments, control signaling may be introduced to indicate a power offset between PSS and SSS/PBCH.

Figure 10:
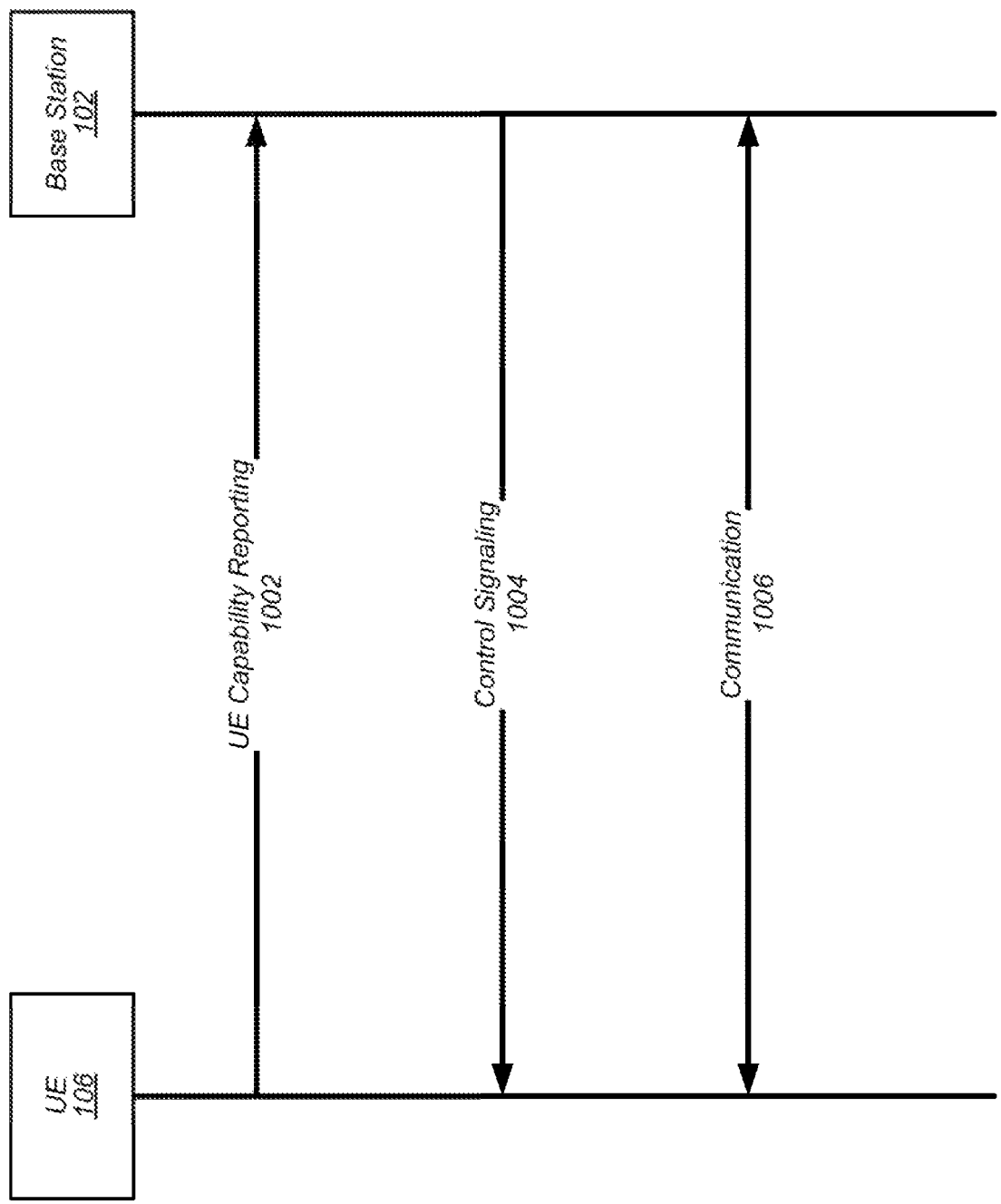
FIG. 10 illustrates an example of signaling for beam indication latency reduction, according to some embodiments.

For example, FIG. 10 illustrates an example of signaling for beam indication latency reduction, according to some embodiments. The signaling shown in FIG. 10 may be used in conjunction with any of the systems, methods, or devices shown in the Figures, among other devices. In various embodiments, some of the signaling shown may be performed concurrently, in a different order than shown, or may be omitted. Additional signaling may also be performed as desired. As shown, this signaling may flow as follows.

At 1002, a UE, such as UE 106, may report a capability of intra-SSB beam sweeping and/or for symbol level beam sweeping. In some embodiments, the UE may report the capability of inter-SSB beam sweeping on a per component carrier, per band, per band combination, and/or per UE basis. In some embodiments, the UE may report a UE capability as whether the UE can support intra-symbol beam sweeping for an SSB. In such embodiments, a number of beams to be applied to an SSB may be predefined, e.g. 3 or 4. In some embodiments, the UE may report a UE capability as a number of beams to be applied for an SSB. In such embodiments, a candidate value may be 3 or 4 beams. Further, in such embodiments, a default value of 1 may be assumed (e.g., if a UE does not report the capability). In other words, by default, the UE may apply one beam per SSB.

At 1004, based on the reported capability, a base station, such as base station 102, may configure a beam sweeping operation for an SSB. In some embodiments, the base station may enable symbol level beam sweeping for an SSB via higher layer signaling, e.g., via control signaling such as RRC signaling and/or a MAC CE. In some embodiments, the base station may configure a number of beams that can be applied for an SSB, e.g., based on the reported capability. In some embodiments, control signaling may be provided on a per SSB basis, a per channel state indicator (CSI) report configuration (e.g., per CSIReportConfig) basis, a per bandwidth part basis, a per serving cell basis, and/or a per UE basis. In some embodiments, the base station may not configure a beam sweeping operation and instead, a number of beams to be applied for an SSB may be based on a number of beam the UE indicated in reported capability. In some embodiments, a CSI-Report Config information element, e.g., as defined by 3GPP TS 38.331 V16.1.0 Section 6.3.2, may be modified to include an intraSymbolBeamSweeping-SSB parameter, e.g., as illustrated by FIG. 11A. As shown, the intraSymbolBeamSweepingSSB parameter may be an enumerated (e.g., with a value of enabled) and/or optional parameter. In some embodiments, a CSI-Report Config information element, e.g., as defined by 3GPP TS 38.331 V16.1.0 Section 6.3.2, may be modified to include a nrof-BeamsPerSSB parameter, e.g., as illustrated by FIG. 11B. As shown, the nrofBeamsPerSSB parameter may be an integer and/or optional parameter.

At 1006, UE 106 and base station 102 may communicate based on a reduced latency for SSB measurement. In other words, latency for SSB measurement may then be reduced according to the signaling between the UE and base station. For example, a value of the variable N (e.g., as defined in 3GPP TS 38.133 V16.4.0) may be determined based on the reported capability for symbol level beam sweeping. Further, based on the reported capability and configuration of the beam sweeping operation for the SSB, communication between the base station and the UE may be conducted with a latency reduction for beam measurement and beam indication. In some embodiments, 3GPP 38.133 V16.4.0 Section 9.5.4.1 may be modified to state:

The UE shall be capable of performing L1-RSRP measurements based on the configured SSB resource for L1-RSRP computation, and the UE physical layer shall be capable of reporting L1-RSRP measured over the measurement period of $T_{L1\text{-}RSRP\ Measurement\ Period\ SSB}$.

The value of $T_{L1\text{-}RSRP\ Measurement\_Period\ SSB}$ is defined in Table 9.5.4.1-1 for FR1 and Table 9.5.4.1-2 for FR2, where M=1 if higher layer parameter timeRestriction-ForChannelMeasurement is configured, and M=3 otherwise N=8 if intra-symbol beam sweeping is not enabled, otherwise N=ceil(8/N_beam), where N_beam is the number of UE beams applied to a SSB.

Thus, in some embodiments, a time period of measurement may be based on the variable N, e.g., which may be determined based on the reported capability for symbol level beam sweeping.

In some embodiments, a base station, such as base station 102, may provide a UE, such as UE 106, an indication of energy per resource element (EPRE) offset between a PSS and SSS/PBCH. For example, in some embodiments, the EPRE offset may be common for all SSBs in a serving cell. In such embodiments, an RRC parameter may be used to configure the EPRE offset. In some embodiments, if and/or when an EPRE offset is not provided, it may be assumed that UE would not be able to apply four beams for an SSB. In some embodiments, the RRC parameter may be added to a servingCellConfigCommon information element, a Serving-CellConfigCommonSIB, information elements, an SSB-Configuration-r16 information element, and/or another information element, e.g., as defined in 3GPP TS 38.331 V16.1.0 Section 6.3.2.

For example, in some embodiments, a ServingCell Config Common information element, e.g., as defined by 3GPP TS 38.331 V16.1.0 Section 6.3.2, may be modified to include an epreOffsetPss parameter. In some embodiments, e.g., as illustrated by FIG. 12A, the epreOffsetPss parameter may be enumerated (e.g., with a value of 0 dB or 3 dB) and/or optional. In some embodiments, the EPRE offset may be configured for each SSB in a serving cell. In such embodiments, a list of EPRE offset may be configured for each SSB in a serving cell. For example, a candidate value could be {0 dB, 3 dB} and a bitmap may be introduced to configure the EPRE ratio between PSS and SSS/PBCH for each SSB. In some embodiments, a ServingCell Config Common information element, e.g., as defined by 3GPP TS 38.331 V 16.1.0 Section 6.3.2, may be modified to include an epreOffsetPss parameter., e.g., as illustrated by FIG. 12B. As shown, the epreOffsetPss parameter may be a bitmap (e.g., with a length of 4, 8, or 64 bits) and/or optional.

Figure 13:
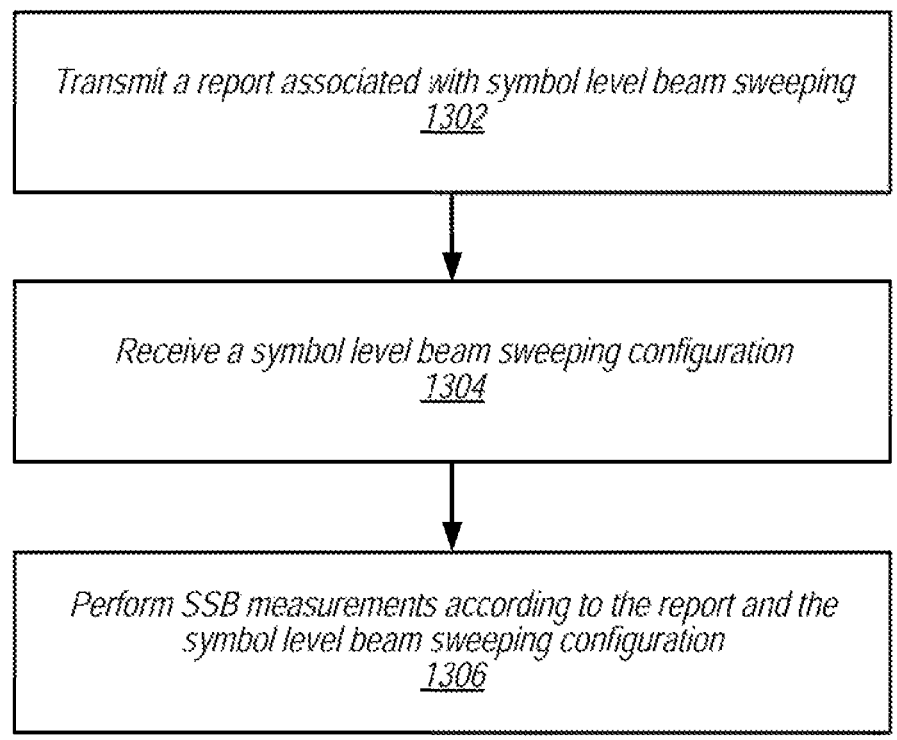
FIG. 13 illustrates a block diagram of an example of a method for beam indication latency reduction, according to some embodiments.

FIG. 13 illustrates a block diagram of an example of a method for beam indication latency reduction, according to some embodiments. The method shown in FIG. 13 may be used in conjunction with any of the systems, methods, or devices shown in the Figures, among other devices. In various embodiments, some of the method elements shown may be performed concurrently, in a different order than shown, or may be omitted. Additional method elements may also be performed as desired. As shown, this method may operate as follows.

At 1302, a UE, such as UE 106, may transmit, to a base station, such as base station 102, a report associated with symbol level beam sweeping (e.g., a report associated with intra-SSB beam sweeping). In some embodiments, the report may be a capability report. In some embodiments, the report may include a capability indicating whether the UE supports symbol level beam sweeping for an SSB. In some embodiments, the report may include an indication of a number of receive beams a UE can apply to an SSB. In some embodiments, the report may be per component carrier, per band, and/or per band combination.

At 1304, the UE may receive, from the base station, a symbol level beam sweeping configuration. In some embodiments, the symbol level beam sweeping configuration may be based, at least in part, on the report. In some embodiments, the symbol level beam sweeping configuration may enable symbol level beam sweeping. In some embodiments, the symbol level beam sweeping configuration may be received via higher layer signaling. In some embodiments, the higher layer signaling may include radio resource control (RRC) signaling and/or a medium access control (MAC) control element (CE). In some embodiments, the symbol level beam sweeping configuration may indicate a number of beams that can be applied for an SSB. In some embodiments, the symbol level beam sweeping configuration may be received via control signaling. In some embodiments, the control signaling may be per SSB, per channel state information (CSI) report configuration, per bandwidth part, per serving cell, and/or per UE.

In some embodiments, the symbol level beam sweeping configuration may be indicated via a parameter included in a channel station information (CSI) report configuration information element (IE). In some embodiments, the CSI report configuration IE may be a CSI-ReportConfig IE. In some embodiments, the parameter may be an intraSymbolBeamSweepingSSB parameter with an enumerated value. In some embodiments, the parameter may be a nrofBeamsPerSSB parameter with an integer value.

At 1306, the UE may perform synchronization signal block (SSB) measurements according to the report and the symbol level beam sweeping configuration. In some embodiments, a time period for SSB measurements may be based, at least in part, on a number of receive beams applied to an SSB.

In some embodiments, the UE may receive, from the base station, an indication of an energy per resource element (EPRE) offset between a primary synchronization symbol (PSS) and a secondary synchronization symbol (SSS) of an SSB and/or an indication of an EPRE offset between the PSS and a physical broadcast channel (PBCH) of the SSB. In some embodiments, the EPRE offset between the PSS and the SSS may be the same as the EPRE offset between the PSS and the PBCH. In some embodiments, the EPRE offset may be received via a radio resource control (RRC) parameter. In some embodiments, the RRC parameter may be included in an RRC information element (IE). In some embodiments, the RRC IE may be one of a servingCellConfigCommon RRC IE, a ServingCEllConfigCommonSIB RRC IE, and/or an SSB-Configuration-r16 RRC IE. In some embodiments, the RRC parameter may be an epreOffsetPss parameter with an enumerated value. In some embodiments, the RRC parameter may be an epreOffsetPss parameter that includes a bitmap. In some embodiments, the EPRE offset may be common for SSBs in a serving cell. In some embodiments, the EPRE offset may be configured for each SSB in a serving cell and a bitmap may indicate a respective EPRE offset for a respective SSB in the serving cell.

Figure 14:
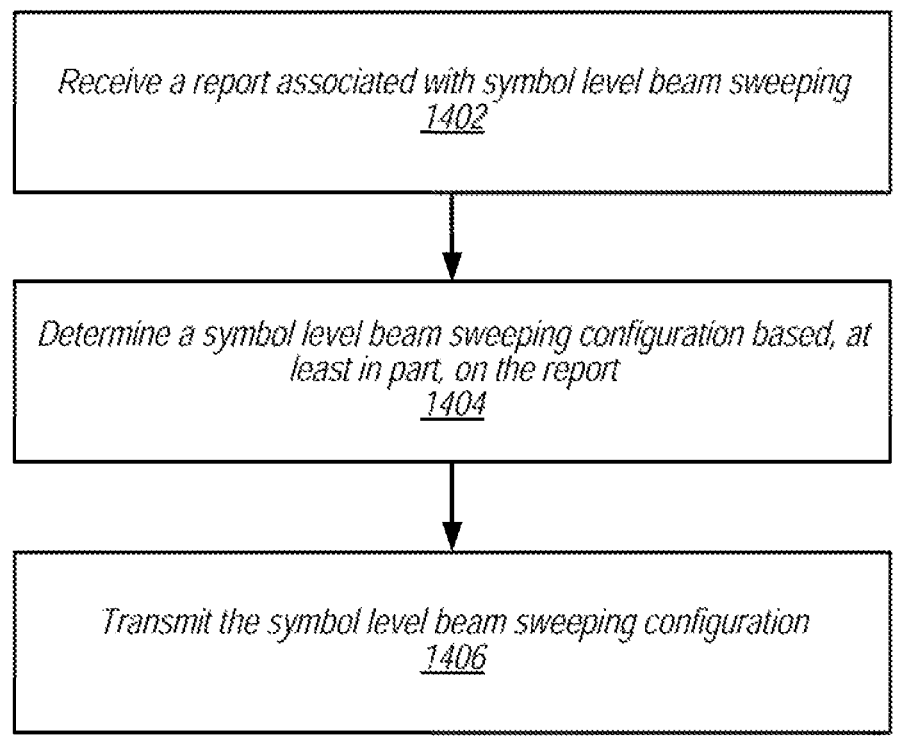
FIG. 14 illustrates a block diagram of another example of a method for beam indication latency reduction, according to some embodiments.

FIG. 14 illustrates a block diagram of another example of a method for beam indication latency reduction, according to some embodiments. The method shown in FIG. 14 may be used in conjunction with any of the systems, methods, or devices shown in the Figures, among other devices. In various embodiments, some of the method elements shown may be performed concurrently, in a different order than shown, or may be omitted. Additional method elements may also be performed as desired. As shown, this method may operate as follows.

At 1402, a base station, such as base station 102, may receive, from a UE, such as UE 106, a report associated with symbol level beam sweeping (e.g., a report associated with intra-SSB beam sweeping). In some embodiments, the report may be a capability report. In some embodiments, the report may include a capability indicating whether the UE supports symbol level beam sweeping for an SSB. In some embodiments, the report may include an indication of a number of receive beams a UE can apply to an SSB. In some embodiments, the report may be per component carrier, per band, and/or per band combination.

At 1404, the base station may determine a symbol level beam sweeping configuration, e.g. based, at least in part, on the report. In some embodiments, the symbol level beam sweeping configuration may enable symbol level beam sweeping. In some embodiments, the symbol level beam sweeping configuration may indicate a number of beams that can be applied for an SSB.

At 1406, the base station may transmit, to the UE, the symbol level beam sweeping configuration. In some embodiments, the symbol level beam sweeping configuration may be transmitted via higher layer signaling. In some embodiments, the higher layer signaling may include radio resource control (RRC) signaling and/or a medium access control (MAC) control element (CE). In some embodiments, the symbol level beam sweeping configuration may be transmitted via control signaling. In some embodiments, the control signaling may be per SSB, per channel state information (CSI) report configuration, per bandwidth part, per serving cell, and/or per UE. In some embodiments, the UE may perform synchronization signal block (SSB) measurements according to the report and the symbol level beam sweeping configuration. In some embodiments, a time period for SSB measurements may be based, at least in part, on a number of receive beams applied to an SSB.

In some embodiments, the symbol level beam sweeping configuration may be indicated via a parameter included in a channel station information (CSI) report configuration information element (IE). In some embodiments, the CSI report configuration IE may be a CSI-ReportConfig IE. In some embodiments, the parameter may be an intraSymbol-BeamSweepingSSB parameter with an enumerated value. In some embodiments, the parameter may be a nrofBeamsPerSSB parameter with an integer value.

In some embodiments, the base station may transmit, to the UE, an indication of an energy per resource element (EPRE) offset between a primary synchronization symbol (PSS) and a secondary synchronization symbol (SSS) of an SSB and/or an indication of an EPRE offset between the PSS and a physical broadcast channel (PBCH) of the SSB. In some embodiments, the EPRE offset between the PSS and the SSS may be the same as the EPRE offset between the PSS and the PBCH. In some embodiments, the EPRE offset may be received via a radio resource control (RRC) parameter. In some embodiments, the RRC parameter may be included in an RRC information element (IE). In some embodiments, the RRC IE may be one of a servingCellConfigCommon RRC IE, a ServingCEllConfigCommonSIB RRC IE, and/or an SSB-Configuration-r16 RRC IE. In some embodiments, the RRC parameter may be an epreOffsetPss parameter with an enumerated value. In some embodiments, the RRC parameter may be an epreOffsetPss parameter that includes a bitmap. In some embodiments, the EPRE offset may be common for SSBs in a serving cell. In some embodiments, the EPRE offset may be configured for each SSB in a serving cell and a bitmap may indicate a respective EPRE offset for a respective SSB in the serving cell.

Figure 15:
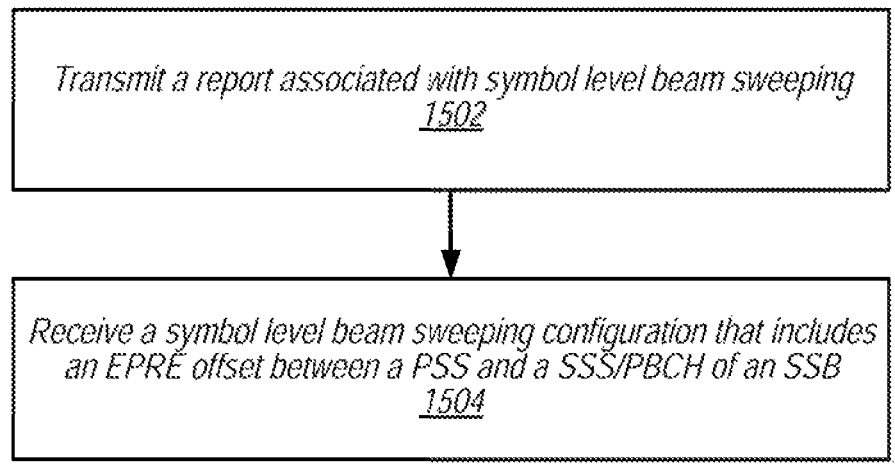
FIG. 15 illustrates a block diagram of an example of a method for indicating an EPRE offset between a PSS and an SSS/PBCH of an SSB, according to some embodiments.

FIG. 15 illustrates a block diagram of an example of a method for indicating an EPRE offset between a PSS and an SSS/PBCH of an SSB, according to some embodiments. The method shown in FIG. 15 may be used in conjunction with any of the systems, methods, or devices shown in the Figures, among other devices. In various embodiments, some of the method elements shown may be performed concurrently, in a different order than shown, or may be omitted. Additional method elements may also be performed as desired. As shown, this method may operate as follows.

At 1502, a UE, such as UE 106, may transmit, to a base station, such as base station 102, a report associated with symbol level beam sweeping (e.g., a report associated with intra-SSB beam sweeping). In some embodiments, the report may be a capability report. In some embodiments, the report may include a capability indicating whether the UE supports symbol level beam sweeping for an SSB. In some embodiments, the report may include an indication of a number of receive beams a UE can apply to an SSB. In some embodiments, the report may be per component carrier, per band, and/or per band combination.

At 1504, the UE may receive, from the base station, a symbol level beam sweeping configuration. In some embodiments, the symbol level beam sweeping configuration may be based, at least in part, on the report. In some embodiments, the symbol level beam sweeping configuration may include an indication of an energy per resource element (EPRE) offset between a primary synchronization symbol (PSS) and a secondary synchronization symbol (SSS) of an SSB and/or an indication of an EPRE offset between the PSS and a physical broadcast channel (PBCH) of the SSB. In some embodiments, the EPRE offset between the PSS and the SSS may be the same as the EPRE offset between the PSS and the PBCH. In some embodiments, the EPRE offset may be received via a radio resource control (RRC) parameter. In some embodiments, the RRC parameter may be included in an RRC information element (IE). In some embodiments, the RRC IE may be one of a servingCellConfigCommon RRC IE, a ServingCEllConfigCommonSIB RRC IE, and/or an SSB-Configuration-r16 RRC IE. In some embodiments, the RRC parameter may be an epreOffsetPss parameter with an enumerated value. In some embodiments, the RRC parameter may be an epreOffsetPss parameter that includes a bitmap. In some embodiments, the EPRE offset may be common for SSBs in a serving cell. In some embodiments, the EPRE offset may be configured for each SSB in a serving cell and a bitmap may indicate a respective EPRE offset for a respective SSB in the serving cell.

In some embodiments, the symbol level beam sweeping configuration may enable symbol level beam sweeping. In some embodiments, the symbol level beam sweeping configuration may be received via higher layer signaling. In some embodiments, the higher layer signaling may include radio resource control (RRC) signaling and/or a medium access control (MAC) control element (CE). In some embodiments, the symbol level beam sweeping configuration may indicate a number of beams that can be applied for an SSB. In some embodiments, the symbol level beam sweeping configuration may be received via control signaling. In some embodiments, the control signaling may be per SSB, per channel state information (CSI) report configuration, per bandwidth part, per serving cell, and/or per UE.

In some embodiments, the symbol level beam sweeping configuration may be indicated via a parameter included in a channel station information (CSI) report configuration information element (IE). In some embodiments, the CSI report configuration IE may be a CSI-ReportConfig IE. In some embodiments, the parameter may be an intraSymbol-BeamSweepingSSB parameter with an enumerated value. In some embodiments, the parameter may be a nrofBeamsPerSSB parameter with an integer value.

In some embodiments, the UE may perform synchronization signal block (SSB) measurements according to the report and the symbol level beam sweeping configuration. In some embodiments, a time period for SSB measurements may be based, at least in part, on a number of receive beams applied to an SSB.

Figure 16:
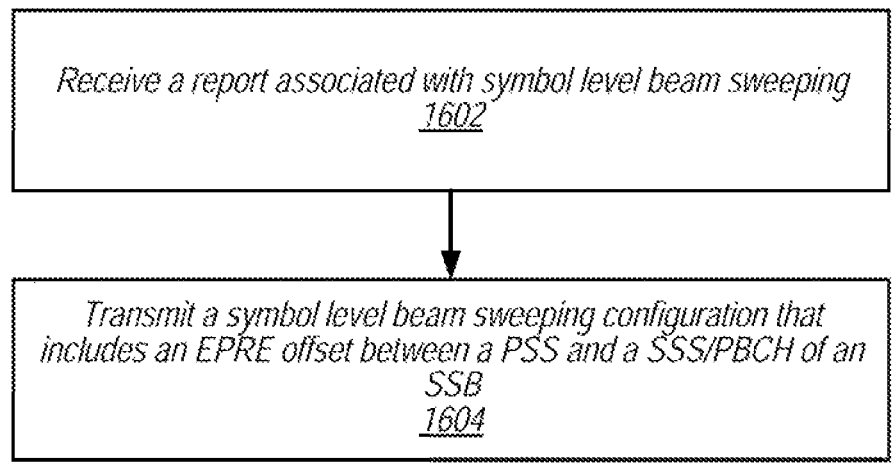
FIG. 16 illustrates a block diagram of another example of a method for indicating an EPRE offset between a PSS and an SSS/PBCH of an SSB, according to some embodiments.

FIG. 16 illustrates a block diagram of another example of a method for indicating an EPRE offset between a PSS and an SSS/PBCH of an SSB, according to some embodiments. The method shown in FIG. 16 may be used in conjunction with any of the systems, methods, or devices shown in the Figures, among other devices. In various embodiments, some of the method elements shown may be performed concurrently, in a different order than shown, or may be omitted. Additional method elements may also be performed as desired. As shown, this method may operate as follows.

At 1602, a base station, such as base station 102, may receive, from a UE, such as UE 106, a report associated with symbol level beam sweeping (e.g., a report associated with intra-SSB beam sweeping). In some embodiments, the report may be a capability report. In some embodiments, the report may include a capability indicating whether the UE supports symbol level beam sweeping for an SSB. In some embodiments, the report may include an indication of a number of receive beams a UE can apply to an SSB. In some embodiments, the report may be per component carrier, per band, and/or per band combination.

At 1604, the base station may transmit, to the UE, a symbol level beam sweeping configuration. In some embodiments, the symbol level beam sweeping configuration may be based, at least in part, on the report. In some embodiments, the symbol level beam sweeping configuration may include an indication of an energy per resource element (EPRE) offset between a primary synchronization symbol (PSS) and a secondary synchronization symbol (SSS) of an SSB and/or an indication of an EPRE offset between the PSS and a physical broadcast channel (PBCH) of the SSB. In some embodiments, the EPRE offset between the PSS and the SSS may be the same as the EPRE offset between the PSS and the PBCH. In some embodiments, the EPRE offset may be received via a radio resource control (RRC) parameter. In some embodiments, the RRC parameter may be included in an RRC information element (IE). In some embodiments, the RRC IE may be one of a servingCellConfigCommon RRC IE, a ServingCEllConfigCommonSIB RRC IE, and/or an SSB-Configuration-r16 RRC IE. In some embodiments, the RRC parameter may be an epreOffsetPss parameter with an enumerated value. In some embodiments, the RRC parameter may be an epreOffsetPss parameter that includes a bitmap. In some embodiments, the EPRE offset may be common for SSBs in a serving cell. In some embodiments, the EPRE offset may be configured for each SSB in a serving cell and a bitmap may indicate a respective EPRE offset for a respective SSB in the serving cell.

In some embodiments, the base station may determine a symbol level beam sweeping configuration, e.g. based, at least in part, on the report. In some embodiments, the symbol level beam sweeping configuration may enable symbol level beam sweeping. In some embodiments, the symbol level beam sweeping configuration may indicate a number of beams that can be applied for an SSB.

In some embodiments, the symbol level beam sweeping configuration may be transmitted via higher layer signaling. In some embodiments, the higher layer signaling may include radio resource control (RRC) signaling and/or a medium access control (MAC) control element (CE). In some embodiments, the symbol level beam sweeping configuration may be transmitted via control signaling. In some embodiments, the control signaling may be per SSB, per channel state information (CSI) report configuration, per bandwidth part, per serving cell, and/or per UE. In some embodiments, the UE may perform synchronization signal block (SSB) measurements according to the report and the symbol level beam sweeping configuration. In some embodiments, a time period for SSB measurements may be based, at least in part, on a number of receive beams applied to an SSB.

In some embodiments, the symbol level beam sweeping configuration may be indicated via a parameter included in a channel station information (CSI) report configuration information element (IE). In some embodiments, the CSI report configuration IE may be a CSI-ReportConfig IE. In some embodiments, the parameter may be an intraSymbolBeamSweepingSSB parameter with an enumerated value. In some embodiments, the parameter may be a nrofBeamsPerSSB parameter with an integer value.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Embodiments of the present disclosure may be realized in any of various forms. For example, some embodiments may be realized as a computer-implemented method, a computer-readable memory medium, or a computer system. Other embodiments may be realized using one or more custom-designed hardware devices such as ASICs. Still other embodiments may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of the method embodiments described herein, or, any combination of the method embodiments described herein, or, any subset of any of the method embodiments described herein, or, any combination of such subsets.

In some embodiments, a device (e.g., a UE 106) may be configured to include a processor (or a set of processors) and a memory medium, where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

Any of the methods described herein for operating a user equipment (UE) may be the basis of a corresponding method for operating a base station, by interpreting each message/signal X received by the UE in the downlink as message/signal X transmitted by the base station, and each message/signal Y transmitted in the uplink by the UE as a message/signal Y received by the base station.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A non-transitory computer readable memory medium storing program instructions executable by a processing circuitry of a wireless device to cause the wireless device to:
   transmit, to a base station, a report associated with symbol level beam sweeping;
   receive, from the base station, a symbol level beam sweeping configuration that is indicated via a parameter included in a channel station information (CSI) report configuration information element (IE), wherein the symbol level beam sweeping configuration is based, at least in part, on the report; and
   perform synchronization signal block (SSB) measurements according to the report and the symbol level beam sweeping configuration.

2. The non-transitory computer readable memory medium of claim 1,
   wherein a time period for SSB measurements is based, at least in part, on a number of receive beams applied to an SSB.

3. The non-transitory computer readable memory medium of claim 1, wherein the report includes a capability indicating whether the wireless device supports symbol level beam sweeping for an SSB.

4. The non-transitory computer readable memory medium of claim 1,
wherein the report includes an indication of a number of receive beams a UE can apply to an SSB.

5. The non-transitory computer readable memory medium of claim 1,
wherein the CSI report configuration IE is a CSI-ReportConfig IE.

6. A method, comprising:
transmitting, to a base station, a report associated with symbol level beam sweeping;
receiving, from the base station, a symbol level beam sweeping configuration that is indicated via a parameter included in a channel station information (CSI) report configuration information element (IE), wherein the symbol level beam sweeping configuration is based, at least in part, on the report; and
performing synchronization signal block (SSB) measurements according to the report and the symbol level beam sweeping configuration.

7. The method of claim 6,
wherein a time period for SSB measurements is based, at least in part, on a number of receive beams applied to an SSB.

8. The method of claim 6,
wherein the report includes a capability indicating whether symbol level beam sweeping for an SSB is supported.

9. The method of claim 6,
wherein the report includes an indication of a number of receive beams a UE can apply to an SSB.

10. The method of claim 6,
wherein the report is per component carrier, per band, per band combination or per UE.

11. The method of claim 6,
wherein the symbol level beam sweeping configuration enables symbol level beam sweeping.

12. The method of claim 6,
wherein the symbol level beam sweeping configuration is received via higher layer signaling, and wherein the higher layer signaling includes radio resource control (RRC) signaling or a medium access control (MAC) control element (CE).

13. The method of claim 6,
wherein the symbol level beam sweeping configuration indicates a number of beams that can be applied for an SSB.

14. The method of claim 6,
wherein the symbol level beam sweeping configuration is received via control signaling, and wherein the control signaling is per SSB, per channel state information (CSI) report configuration, per bandwidth part, per serving cell, or per UE.

15. A processor, comprising:
a memory; and
processing circuitry in communication with the memory and configured to cause a wireless device to:
transmit, to a base station, a report associated with symbol level beam sweeping;
receive, from the base station, a symbol level beam sweeping configuration that is indicated via a parameter included in a channel station information (CSI) report configuration information element (IE), wherein the symbol level beam sweeping configuration is based, at least in part, on the report; and
perform synchronization signal block (SSB) measurements according to the report and the symbol level beam sweeping configuration.

16. The processor of claim 15,
wherein the CSI report configuration IE is a CSI-ReportConfig IE.

17. The processor of claim 15,
wherein the parameter is an intraSymbolBeamSweepingSSB parameter with an enumerated value or a nrofBeamsPerSSB parameter with an integer value.

18. The processor of claim 15,
wherein the processor is further configured to cause the wireless device to:
receive, from the base station, an indication of an energy per resource element (EPRE) offset between a primary synchronization symbol (PSS) and a secondary synchronization symbol (SSS) of an SSB or an indication of an EPRE offset between the PSS and a physical broadcast channel (PBCH) of the SSB, wherein the EPRE offset is common for SSBs in a serving cell or the EPRE offset is configured for each SSB in a serving cell.

19. The processor of claim 18,
wherein the EPRE offset is received via a radio resource control (RRC) parameter, wherein the RRC parameter is included in an RRC information element (IE), and wherein the RRC IE is one of a servingCellConfigCommon RRC IE, a ServingCEllConfigCommonSIB RRC IE, or an SSB-Configuration-r16 RRC IE, wherein the RRC parameter is one of an epreOffsetPss parameter with an enumerated value or an epreOffsetPss parameter that includes a bitmap.

20. The processor of claim 18,
wherein a bitmap indicates a respective EPRE offset for a respective SSB in the serving cell.

* * * * *